US012771485B2

(12) United States Patent
Maamari et al.

(10) Patent No.: US 12,771,485 B2
(45) Date of Patent: Oct. 20, 2026

(54) TECHNIQUES FOR DETERMINING A FEEDBACK IDENTIFIER IN AN INACTIVE COMMUNICATION PERIOD

(71) Applicant: QUALCOMM Incorporated, San Diego, CA (US)

(72) Inventors: Diana Maamari, San Diego, CA (US); Huilin Xu, Temecula, CA (US); Mickael Mondet, Louannec (FR); Ahmed Attia Abotabl, San Diego, CA (US); Linhai He, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 319 days.

(21) Appl. No.: 18/538,671

(22) Filed: Dec. 13, 2023

(65) Prior Publication Data

US 2025/0202628 A1 Jun. 19, 2025

(51) Int. Cl.
*H04L 1/1825* (2023.01)
*H04L 1/1812* (2023.01)

(52) U.S. Cl.
CPC .......... *H04L 1/1825* (2013.01); *H04L 1/1812* (2013.01)

(58) Field of Classification Search
CPC ... H04L 1/1825; H04L 1/1812; H04L 1/1887; H04L 1/1896; H04L 1/1822; H04W 72/23; H04W 76/28
See application file for complete search history.

(56) References Cited

U.S. PATENT DOCUMENTS

2024/0224271 A1* 7/2024 Xiong ............... H04W 56/0015
2024/0414581 A1* 12/2024 Esswie .............. H04W 52/0229

FOREIGN PATENT DOCUMENTS

WO WO-2024257356 A1 * 12/2024 ............ H04W 72/23

OTHER PUBLICATIONS

International Search Report and Written Opinion—PCT/US2024/056719—ISA/EPO—Feb. 24, 2025.
Merias P., (Moderator Ericsson) et al., "Moderator Summary#3—Maintenance of XR Enhancements", R1-2312387, 3GPP TSG-RAN WG1 Meeting #115, Type Discussion, NR_XR_ENH-CORE, 3rd Generation Partnership Project, Mobile Competence Centre, 650, Route Des Lucioles, F-06921 Sophia-Antipolis Cedex, France, vol. RAN WG1, No. Chicago, USA, Nov. 13, 2023-Nov. 17, 2023, Nov. 20, 2023, XP052549853, 65 Pages, p. 35-p. 36 p. 50.

* cited by examiner

*Primary Examiner* — Mandish K Randhawa
(74) *Attorney, Agent, or Firm* — Holland & Hart LLP

(57) ABSTRACT

Methods, systems, and devices for method of wireless communication are described. The described techniques provide for a first network entity to receive a configuration to communicate with a second network entity, where the configuration indicates multiple discontinuous active time periods and multiple discontinuous inactive time periods for the second network entity. The first network entity may receive a configuration of multiple configured grant (CG) transmission occasions for uplink communications by the first network entity and communicate with the second network entity during a first CG transmission occasion in accordance with a hybrid automatic repeat request (HARQ) process identifier. The HARQ process identifier may be based on a second CG transmission occasion of the multiple CG transmission occasions that is invalid due to the second CG transmission occasion overlapping with a first discontinuous inactive time period of the multiple discontinuous inactive time periods.

21 Claims, 17 Drawing Sheets

TECHNIQUES FOR DETERMINING A FEEDBACK IDENTIFIER IN AN INACTIVE COMMUNICATION PERIOD

INTRODUCTION

The following relates to wireless communications that pertain to techniques for determining a feedback identifier in an inactive communication period.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support techniques for determining a feedback identifier in an inactive communication period. For example, the described techniques provide for a first network entity to receive a configuration to communicate with a second network entity, where the configuration indicates multiple discontinuous active time periods and multiple discontinuous inactive time periods for the second network entity. The first network entity may receive a configuration of multiple configured grant (CG) transmission occasions for uplink communications by the first network entity and communicate with the second network entity during a first CG transmission occasion in accordance with a hybrid automatic repeat request (HARQ) process identifier. The HARQ process identifier may be based on a second CG transmission occasion of the multiple CG transmission occasions that is invalid due to the second CG transmission occasion overlapping with a first discontinuous inactive time period of the multiple discontinuous inactive time periods. In some cases, the first network entity increments a value for the HARQ process identifier irrespective of the second CG transmission occasion that is invalid. Additionally, or alternatively, the first network entity may refrain from incrementing the HARQ process identifier based on the second CG transmission occasion that is invalid.

A method by a first network entity is described. The method may include receiving a configuration for communicating with a second network entity, where the configuration indicates a set of multiple discontinuous active time periods for the second network entity and a set of multiple discontinuous inactive time periods for the second network entity, receiving a configuration of a set of multiple CG transmission occasions for uplink communications by the first network entity, and communicating with the second network entity during a first CG transmission occasion in accordance with a HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

A first network entity is described. The first network entity may include one or more memories storing processor executable code, and one or more processors coupled with the one or more memories. The one or more processors may individually or collectively operable to execute the code to cause the first network entity to receive a configuration for communicating with a second network entity, where the configuration indicates a set of multiple discontinuous active time periods for the second network entity and a set of multiple discontinuous inactive time periods for the second network entity, receive a configuration of a set of multiple CG transmission occasions for uplink communications by the first network entity, and communicate with the second network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

Another first network entity is described. The first network entity may include means for receiving a configuration for communicating with a second network entity, where the configuration indicates a set of multiple discontinuous active time periods for the second network entity and a set of multiple discontinuous inactive time periods for the second network entity, means for receiving a configuration of a set of multiple CG transmission occasions for uplink communications by the first network entity, and means for communicating with the second network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

A non-transitory computer-readable medium storing code is described. The code may include instructions executable by one or more processors to receive a configuration for communicating with a second network entity, where the configuration indicates a set of multiple discontinuous active time periods for the second network entity and a set of multiple discontinuous inactive time periods for the second network entity, receive a configuration of a set of multiple CG transmission occasions for uplink communications by the first network entity, and communicate with the second network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

Some examples of the method, first network entities, and non-transitory computer-readable medium described herein may further include operations, features, means, or instructions for incrementing a value for the HARQ process identifier corresponding to the second CG transmission occasion irrespective of the second CG transmission occasion that may be invalid due to overlapping with the first discontinuous inactive time period. Some examples of the method, first network entities, and non-transitory computer-readable medium described herein may further include operations, features, means, or instructions for incrementing the value for the HARQ process identifier corresponding to the second CG transmission occasion may be based on at least one of a retransmission timer that may be disabled, a feedback mode that may be enabled, a threshold quantity of allowed retransmissions, a quantity of dropped transmission occasions, or a combination thereof.

Some examples of the method, first network entities, and non-transitory computer-readable medium described herein may further include operations, features, means, or instructions for refraining from incrementing a value for the HARQ process identifier corresponding to the second CG transmission occasion based on the second CG transmission occasion that may be invalid due to overlapping with the first discontinuous inactive time period. Some examples of the method, first network entities, and non-transitory computer-readable medium described herein may further include operations, features, means, or instructions for incrementing the value for the HARQ process identifier corresponding to the first CG transmission occasion occurring after the second CG transmission occasion.

Some examples of the method, first network entities, and non-transitory computer-readable medium described herein may further include operations, features, means, or instructions for transmitting an uplink control signal indicating that a quantity of transmission occasions may be invalid due to overlapping with one or more of the set of multiple discontinuous inactive time periods, where to refrain from incrementing the value for the HARQ process identifier corresponding to the second CG transmission occasion may be based on transmitting the uplink control signal that indicates the quantity of transmission occasions.

Some examples of the method, first network entities, and non-transitory computer-readable medium described herein may further include operations, features, means, or instructions for receiving an indication to reactivate the second CG transmission occasion scheduled to be invalid due to overlapping with the first discontinuous inactive time period. Some examples of the method, first network entities, and non-transitory computer-readable medium described herein may further include operations, features, means, or instructions for incrementing a value for the HARQ process identifier corresponding to the second CG transmission occasion based on a time difference between receipt of the indication and the second CG transmission occasion satisfying a threshold.

Some examples of the method, first network entities, and non-transitory computer-readable medium described herein may further include operations, features, means, or instructions for incrementing a value for the HARQ process identifier corresponding to the second CG transmission occasion based on an activation purpose corresponding to the indication that may be a synchronization signal block transmission or a random access channel transmission. Some examples of the method, first network entities, and non-transitory computer-readable medium described herein may further include operations, features, means, or instructions for refraining from incrementing a value for the HARQ process identifier corresponding to the second CG transmission occasion based on a time difference between receipt of the indication and the second CG transmission occasion satisfying a threshold and an activation purpose corresponding to the indication that may be other than a synchronization signal block transmission or a random access channel transmission.

A method by a second network entity is described. The method may include outputting, to a first network entity, a configuration for communicating with the second network entity, where the configuration indicates a set of multiple discontinuous active time periods for the second network entity and a set of multiple discontinuous inactive time periods for the second network entity, outputting a configuration of a set of multiple CG transmission occasions for uplink communications by the first network entity, and communicating with the first network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

A second network entity is described. The second network entity may include one or more memories storing processor executable code, and one or more processors coupled with the one or more memories. The one or more processors may individually or collectively operable to execute the code to cause the second network entity to output, to a first network entity, a configuration for communicating with the second network entity, where the configuration indicates a set of multiple discontinuous active time periods for the second network entity and a set of multiple discontinuous inactive time periods for the second network entity, output a configuration of a set of multiple CG transmission occasions for uplink communications by the first network entity, and communicate with the first network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

Another second network entity is described. The second network entity may include means for outputting, to a first network entity, a configuration for communicating with the second network entity, where the configuration indicates a set of multiple discontinuous active time periods for the second network entity and a set of multiple discontinuous inactive time periods for the second network entity, means for outputting a configuration of a set of multiple CG transmission occasions for uplink communications by the first network entity, and means for communicating with the first network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

A non-transitory computer-readable medium storing code is described. The code may include instructions executable by one or more processors to output, to a first network entity, a configuration for communicating with the second network entity, where the configuration indicates a set of multiple discontinuous active time periods for the second network entity and a set of multiple discontinuous inactive time periods for the second network entity, output a configuration of a set of multiple CG transmission occasions for uplink communications by the first network entity, and communicate with the first network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

Some examples of the method, second network entities, and non-transitory computer-readable medium described herein may further include operations, features, means, or instructions for incrementing a value for the HARQ process identifier corresponding to the second CG transmission occasion irrespective of the second CG transmission occasion that may be invalid due to overlapping with the first discontinuous inactive time period. Some examples of the method, second network entities, and non-transitory computer-readable medium described herein may further include operations, features, means, or instructions for incrementing the value for the HARQ process identifier corresponding to the second CG transmission occasion may be based on at least one of a retransmission timer that may be disabled, a feedback mode that may be enabled, a threshold quantity of allowed retransmissions, a quantity of dropped transmission occasions, or a combination thereof.

Some examples of the method, second network entities, and non-transitory computer-readable medium described herein may further include operations, features, means, or instructions for refraining from incrementing a value for the HARQ process identifier corresponding to the second CG transmission occasion based on the second CG transmission occasion that may be invalid due to overlapping with the first discontinuous inactive time period. Some examples of the method, second network entities, and non-transitory computer-readable medium described herein may further include operations, features, means, or instructions for incrementing the value for the HARQ process identifier corresponding to the first CG transmission occasion occurring after the second CG transmission occasion.

Some examples of the method, second network entities, and non-transitory computer-readable medium described herein may further include operations, features, means, or instructions for obtaining an uplink control signal indicating that a quantity of transmission occasions may be invalid due to overlapping with one or more of the set of multiple discontinuous inactive time periods, where refraining from incrementing the value for the HARQ process identifier corresponding to the second CG transmission occasion may be based on obtaining the uplink control signal that indicates the quantity of transmission occasions.

Some examples of the method, second network entities, and non-transitory computer-readable medium described herein may further include operations, features, means, or instructions for outputting an indication to reactivate the second CG transmission occasion scheduled to be invalid due to overlapping with the first discontinuous inactive time period. Some examples of the method, second network entities, and non-transitory computer-readable medium described herein may further include operations, features, means, or instructions for incrementing a value for the HARQ process identifier corresponding to the second CG transmission occasion based on a time difference between receipt of the indication and the second CG transmission occasion satisfying a threshold.

Some examples of the method, second network entities, and non-transitory computer-readable medium described herein may further include operations, features, means, or instructions for incrementing a value for the HARQ process identifier corresponding to the second CG transmission occasion based on an activation purpose corresponding to the indication that may be a synchronization signal block transmission or a random access channel transmission.

Some examples of the method, second network entities, and non-transitory computer-readable medium described herein may further include operations, features, means, or instructions for refraining from incrementing a value for the HARQ process identifier corresponding to the second CG transmission occasion based on a time difference between transmission of the indication and the second CG transmission occasion satisfying a threshold and an activation purpose corresponding to the indication that may be other than a synchronization signal block transmission or a random access channel transmission.

An apparatus network entity for wireless communication is described. The apparatus may include a processing system configured to, receive a configuration to communicate with a second network entity, where the configuration indicates a set of multiple discontinuous active time periods for the second network entity and a set of multiple discontinuous inactive time periods for the second network entity, receive a configuration of a set of multiple CG transmission occasions for uplink communications by the first network entity, and communicate with the second network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

In some examples of the apparatus, the processing system may be configured to increment a value for the HARQ process identifier corresponding to the second CG transmission occasion irrespective of the second CG transmission occasion that may be invalid due to overlapping with the first discontinuous inactive time period. In some examples of the apparatus, increment of the value for the HARQ process identifier corresponding to the second CG transmission occasion may be based on at least one of a retransmission timer that may be disabled, a feedback mode that may be enabled, a threshold quantity of allowed retransmissions, a quantity of dropped transmission occasions, or a combination thereof.

In some examples of the apparatus, the processing system may be configured to refrain from incrementing a value for the HARQ process identifier corresponding to the second CG transmission occasion based on the second CG transmission occasion that may be invalid due to overlapping with the first discontinuous inactive time period. In some examples of the apparatus, the processing system may be configured to increment the value for the HARQ process identifier corresponding to the first CG transmission occasion occurring after the second CG transmission occasion.

In some examples of the apparatus, the processing system may be configured to transmit an uplink control signal that indicates that a quantity of transmission occasions may be invalid due to overlapping with one or more of the set of multiple discontinuous inactive time periods, where to refrain from incrementing the value for the HARQ process identifier corresponding to the second CG transmission occasion may be based on transmitting the uplink control signal that indicates the quantity of transmission occasions.

In some examples of the apparatus, the processing system may be configured to receive an indication to reactivate the second CG transmission occasion scheduled to be invalid due to overlapping with the first discontinuous inactive time period. In some examples of the apparatus, the processing system may be configured to increment a value for the HARQ process identifier corresponding to the second CG transmission occasion based on a time difference between receipt of the indication and the second CG transmission occasion satisfying a threshold. In some examples of the apparatus, the processing system may be configured to increment a value for the HARQ process identifier corresponding to the second CG transmission occasion based on an activation purpose corresponding to the indication that may be a synchronization signal block transmission or a random access channel transmission.

In some examples of the apparatus, the processing system may be configured to refrain from incrementing a value for the HARQ process identifier corresponding to the second CG transmission occasion based on a time difference between receipt of the indication and the second CG transmission occasion satisfying a threshold and an activation purpose corresponding to the indication that may be other than a synchronization signal block transmission or a random access channel transmission.

Another apparatus network entity for wireless communication is described. The apparatus may include a processing system configured to, output, to a first network entity, a configuration to communicate with the second network entity, where the configuration indicates a set of multiple discontinuous active time periods for the second network entity and a set of multiple discontinuous inactive time periods for the second network entity, output a configuration of a set of multiple CG transmission occasions for uplink communications by the first network entity, and communicate with the first network entity during a first CG transmission occasion in accordance with an HARQ process identifier, where the HARQ process identifier is based on a second CG transmission occasion of the set of multiple CG transmission occasions that is invalid due to the second CG transmission occasion overlapping with a first discontinuous inactive time period of the set of multiple discontinuous inactive time periods.

In some examples of the apparatus, the processing system may be configured to increment a value for the HARQ process identifier corresponding to the second CG transmission occasion irrespective of the second CG transmission occasion that may be invalid due to overlapping with the first discontinuous inactive time period. In some examples of the apparatus, incrementing the value for the HARQ process identifier corresponding to the second CG transmission occasion may be based on at least one of a retransmission timer that may be disabled, a feedback mode that may be enabled, a threshold quantity of allowed retransmissions, a quantity of dropped transmission occasions, or a combination thereof.

In some examples of the apparatus, the processing system may be configured to refrain from incrementing a value for the HARQ process identifier corresponding to the second CG transmission occasion based on the second CG transmission occasion that may be invalid due to overlapping with the first discontinuous inactive time period. In some examples of the apparatus, the processing system may be configured to increment the value for the HARQ process identifier corresponding to the first CG transmission occasion occurring after the second CG transmission occasion.

In some examples of the apparatus, the processing system may be configured to obtain an uplink control signal that indicates that a quantity of transmission occasions may be invalid due to overlapping with one or more of the set of multiple discontinuous inactive time periods, where refraining from incrementing the value for the HARQ process identifier corresponding to the second CG transmission occasion may be based on obtaining the uplink control signal that indicates the quantity of transmission occasions.

In some examples of the apparatus, the processing system may be configured to output an indication to reactivate the second CG transmission occasion scheduled to be invalid due to overlapping with the first discontinuous inactive time period. In some examples of the apparatus, the processing system may be configured to increment a value for the HARQ process identifier corresponding to the second CG transmission occasion based on a time difference between receipt of the indication and the second CG transmission occasion satisfying a threshold. In some examples of the apparatus, the processing system may be configured to increment a value for the HARQ process identifier corresponding to the second CG transmission occasion based on an activation purpose corresponding to the indication that may be a synchronization signal block transmission or a random access channel transmission.

In some examples of the apparatus, the processing system may be configured to refrain from incrementing a value for the HARQ process identifier corresponding to the second CG transmission occasion based on a time difference between transmission of the indication and the second CG transmission occasion satisfying a threshold and an activation purpose corresponding to the indication that may be other than a synchronization signal block transmission or a random access channel transmission.

DETAILED DESCRIPTION

Figure 1:
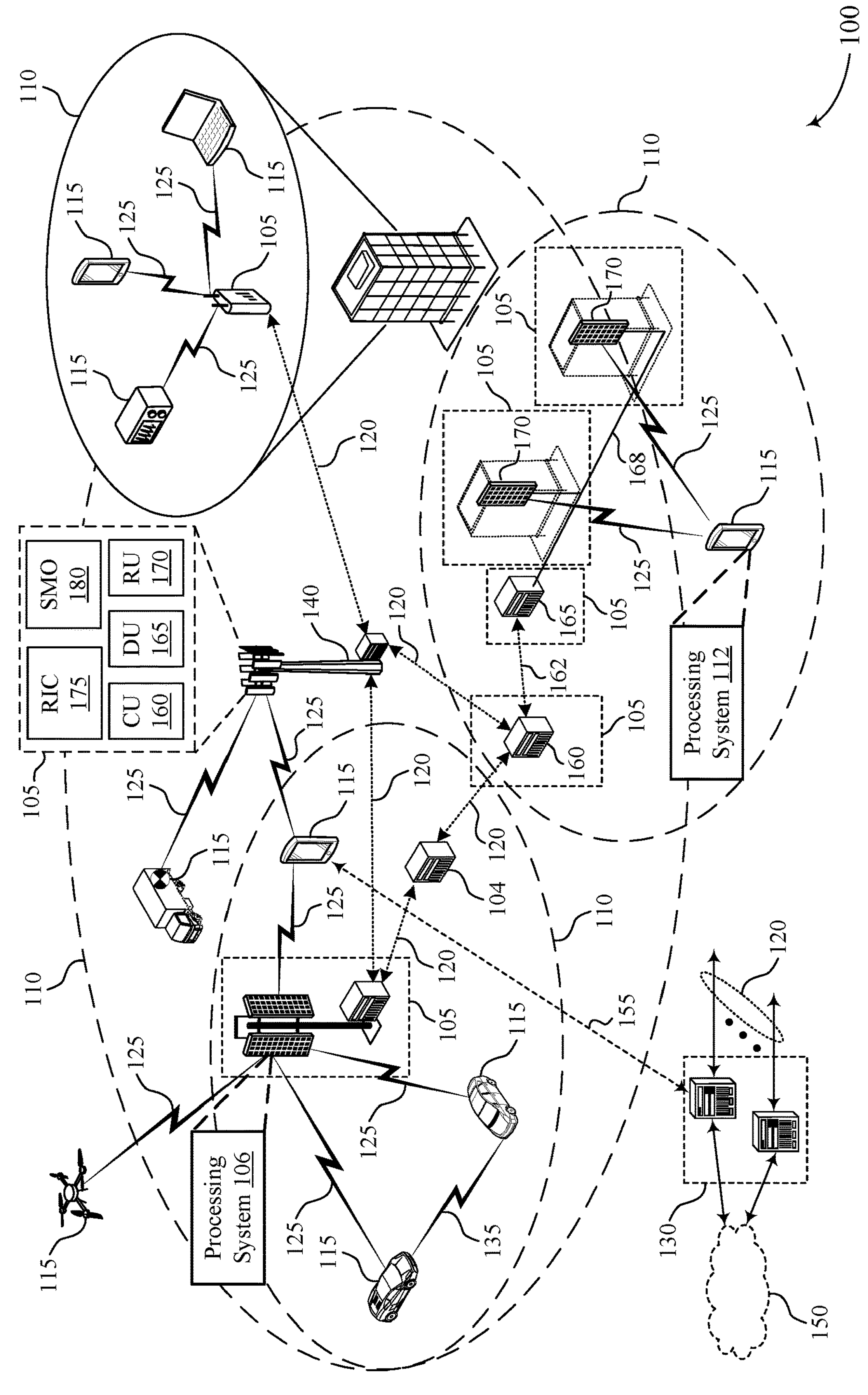
FIGS. 1 through 4 show examples of wireless communications systems that support techniques for determining a feedback identifier in an inactive communication period in accordance with one or more aspects of the present disclosure.

In some wireless communications systems, a second network entity (e.g., base station) may communicate in accordance with discontinuous cycles of activity and inactivity of transmissions and receptions (e.g., discontinuous transmission (DTX) or discontinuous reception (DRX)) to save power. In some examples, the second network entity may transmit to a first network entity (e.g., a user equipment (UE)), an indication of the discontinuous cycles (e.g., so that the first network entity may also save power). In some cases, the second network entity may configure the first network entity with multiple physical uplink shared channels (PUSCHs), where there are multiple PUSCH occasions in a configured grant (CG) period. The multiple PUSCH occasions may be useful for uplink video transmissions, such as in extended reality (XR) applications. However, in some wireless communications systems, at least one PUSCH occasion of the multiple PUSCH occasions may fall outside of a discontinuous active duration of a second network entity's discontinuous cycle. The first network entity may drop the at least one PUSCH occasion based on receiving an indication of the second network entity's discontinuous inactive duration. In some examples, a hybrid automatic repeat request (HARQ) process identification number (HPN) is used to synchronize transmissions between the first network entity and the second network entity.

The wireless communications system may support techniques for determining an HPN for a PUSCH occasion overlapping with a discontinuous inactive period. In some aspects, a first network entity increments the HPN for dropped PUSCH occasions. In some examples, the first network entity may increment the HPN for dropped PUSCH occasions based on a disabled retransmission timer (e.g., in XR applications where there are no re-transmissions), a limited quantity of retransmissions, or a quantity of dropped PUSCH occasions exceeding a threshold. Additionally, or alternatively, the first network entity may not increment the HPN for dropped PUSCH occasions. For example, the first network entity may not increment the HPN for dropped PUSCH occasions based on an indication of a quantity of dropped PUSCH occasions in a skipping indication. In some cases, a second network entity may transmit dynamic extension signaling to add an additional discontinuous active duration. In such cases, the first network entity may increment or not increment the HPN based on a threshold duration between the dynamic extension signaling and the dropping of the PUSCH occasion.

Aspects of the disclosure are initially described in the context of wireless communications systems. Aspects of the disclosure are further illustrated by and described with reference to a process flow. Aspects of the disclosure are further illustrated by and described with reference to apparatus diagrams, system diagrams, and flowcharts that relate to techniques for determining a feedback identifier in an inactive communication period.

FIG. 1 shows an example of a wireless communications system 100 that supports techniques for determining a feedback identifier in an inactive communication period in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a network entity (which may alternatively be referred to as an entity, a node, a network node, or a wireless entity) may be, be similar to, include, or be included in (e.g., be a component of) a base station (e.g., any base station described herein, including a disaggregated base station), a UE (e.g., any UE described herein), a reduced capability (RedCap) device, an enhanced reduced capability (eRedCap) device, an ambient internet-of-things (IoT) device, an energy harvesting (EH)-capable device, a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network entity may be a UE. As another example, a network entity may be a base station. As used herein, "network entity" may refer to an entity that is configured to operate in a network, such as the network 105. For example, a "network entity" is not limited to an entity that is currently located in and/or currently operating in the network. Rather, a network entity may be any entity that is capable of communicating and/or operating in the network.

The adjectives "first," "second," "third," and so on are used for contextual distinction between two or more of the modified noun in connection with a discussion and are not meant to be absolute modifiers that apply only to a certain respective entity throughout the entire document. For example, a network entity may be referred to as a "first network entity" in connection with one discussion and may be referred to as a "second network entity" in connection with another discussion, or vice versa. As an example, a first network entity may be configured to communicate with a second network entity or a third network entity. In one aspect of this example, the first network entity may be a UE, the second network entity may be a base station, and the third network entity may be a UE. In another aspect of this example, the first network entity may be a UE, the second network entity may be a base station, and the third network entity may be a base station. In yet other aspects of this example, the first, second, and third network entities may be different relative to these examples.

Similarly, reference to a UE, base station, apparatus, device, computing system, or the like may include disclosure of the UE, base station, apparatus, device, computing system, or the like being a network entity. For example, disclosure that a UE is configured to receive information from a base station also discloses that a first network entity is configured to receive information from a second network entity. Consistent with this disclosure, once a specific example is broadened in accordance with this disclosure (e.g., a UE is configured to receive information from a base station also discloses that a first network entity is configured to receive information from a second network entity), the broader example of the narrower example may be interpreted in the reverse, but in a broad open-ended way. In the example above where a UE is configured to receive information from a base station also discloses that a first network entity is configured to receive information from a second network entity, the first network entity may refer to a first UE, a first base station, a first apparatus, a first device, a first computing system, a first set of one or more one or more components, a first processing entity, or the like configured to receive the information; and the second network entity may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network entity may be described as being configured to transmit information to a second network entity. In this example and consistent with this disclosure, disclosure that the first network entity is configured to transmit information to the second network entity includes disclosure that the first network entity is configured to provide, send, output, communicate, or transmit information to the second network entity. Similarly, in this example and consistent with this disclosure, disclosure that the first network entity is configured to transmit information to the second network entity includes disclosure that the second network entity is configured to receive, obtain, or decode the information that is provided, sent, output, communicated, or transmitted by the first network entity.

As shown, the network entity (e.g., network entity 105) may include a processing system 106. Similarly, the network entity (e.g., UE 115) may include a processing system 112. A processing system may include one or more components (or subcomponents), such as one or more components described herein. For example, a respective component of the one or more components may be, be similar to, include, or be included in at least one memory, at least one communication interface, or at least one processor. For example, a processing system may include one or more components. In such an example, the one or more components may include a first component, a second component, and a third component. In this example, the first component may be coupled to a second component and a third component. In this example, the first component may be at least one processor, the second component may be a communication interface, and the third component may be at least one memory. A processing system may generally be a system one or more components that may perform one or more functions, such as any function or combination of functions described herein. For example, one or more components may receive input information (e.g., any information that is an input, such as a signal, any digital information, or any other information), one or more components may process the input information to generate output information (e.g., any information that is an output, such as a signal or any other information), one or more components may perform any function as described herein, or any combination thereof. As described herein, an "input" and "input information" may be used interchangeably. Similarly, as described herein, an "output" and "output information" may be used interchangeably. Any information generated by any component may be provided to one or more other systems or components of, for example, a network entity described herein). For example, a processing system may include a first component configured to receive or obtain information, a second component configured to process the information to generate output information, and/or a third component configured to provide the output information to other systems or components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a processing system may include at least one memory, at least one communication interface, and/or at least one processor, where the at least one processor may, for example, be coupled to the at least one memory and the at least one communication interface.

A processing system of a network entity described herein may interface with one or more other components of the network entity, may process information received from one or more other components (such as input information), or may output information to one or more other components. For example, a processing system may include a first component configured to interface with one or more other components of the network entity to receive or obtain information, a second component configured to process the information to generate one or more outputs, and/or a third component configured to output the one or more outputs to one or more other components. In this example, the first component may be a communication interface (e.g., a first communication interface), the second component may be at least one processor (e.g., that is coupled to the communication interface and/or at least one memory), and the third component may be a communication interface (e.g., the first communication interface or a second communication interface). For example, a chip or modem of the network entity may include a processing system. The processing system may include a first communication interface to receive or obtain information, and a second communication interface to output, transmit, or provide information. In some examples, the first communication interface may be an interface configured to receive input information, and the information may be provided to the processing system. In some examples, the second system interface may be configured to transmit information output from the chip or modem. The second communication interface may also obtain or receive input information, and the first communication interface may also output, transmit, or provide information.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for determining a feedback identifier in an inactive communication period as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO)

communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. HARQ feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., ARQ). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some systems, the second network entity 105 may operate in different modes and operations to support power savings and maintain network operation. In some aspects, the second network entity 105 may switch modes based on a network input and current traffic conditions (e.g., transmissions and receptions). In some cases, the second network entity 105 may enable discontinuous active durations and discontinuous inactive durations (e.g., to save power) for the second network entity 105. In such cases, the second network entity 105 may transmit configuration signaling to the first network entity 115 to indicate discontinuous cycles in which the second network entity 105 is active or inactive in transmission or reception.

In some aspects, the discontinuous cycles may indicate cycles for activity and inactivity of transmissions and receptions specific to the second network entity 105. For example, the second network entity 105 may enter a sleep mode in the discontinuous inactive duration by aligning serving first network entities 105 in short durations during the discontinuous active duration (e.g., instead of spreading the UEs' 115 service across all durations). In some cases, the second network entity 105 may transmit a configuration configuring the discontinuous cycles (e.g., cycles of active and inactive time durations) to the first network entity 115. In such cases, the first network entity 115 may utilize the discontinuous cycles to support energy saving. For example, the first network entity 115 may not transmit or receive signaling (e.g., periodic or semi-persistent CSI-RS, PRS, or SPS-PDSCH in uplink and SR, periodic or semi-persistent CSI report, periodic or semi-persistent SRS, or CG-PUSCH in downlink) during the discontinuous inactive durations of the discontinuous cycle.

In some examples, multiple PUSCH CG may configure multiple PUSCH occasions (e.g., to accommodate for uplink video transmission without concerning scheduling request or buffer status report delay with dynamic grant). In some cases, the second network entity 105 may configure the discontinuous cycles of communications between the first network entity 115 and the second network entity 105. The first network entity 115 may determine that at least one of the multiple PUSCH occasions overlaps with the discontinuous inactive duration of the second network entity 105. In such cases, the first network entity 115 may indicate overallocated occasions to be skipped PUSCH occasions in a uplink control information (UCI) skipping indication. Additionally, or alternatively, the first network entity 115 may drop at least one PUSCH based on the at least one PUSCH overlapping with the discontinuous inactive duration. In some examples, an HPN is used to synchronize transmissions between the first network entity 115 and the second network entity 105. But, in some other wireless communications systems, a second network entity and a first network entity (e.g., UE) may not be aligned on techniques for determining HPNs based on the UE dropping a PUSCH during the second network entity's discontinuous inactive duration.

The wireless communications system 100 may support techniques for determining an HPN in a discontinuous inactive period. In some aspects, a first network entity 115 may increment the HPN for dropped PUSCH occasions. The first network entity 115 may increment the HPN for dropped PUSCH occasions based on a disabled retransmission timer (e.g., in XR applications where there are no re-transmissions), a limited quantity of retransmissions, or a quantity of dropped PUSCH occasions exceeding a threshold. Additionally, or alternatively, the first network entity 115 may not increment the HPN for dropped PUSCH occasions. For example, the first network entity 115 may not increment the HPN for dropped PUSCH occasions based on an indication of a quantity of dropped PUSCH occasions in a skipping indication. In some cases, a second network entity 105 may transmit dynamic extension signaling to add an additional discontinuous active duration. In such cases, the first network entity 115 may increment or not increment the HPN based on a threshold duration between the dynamic extension signaling and the dropping of the PUSCH occasion.

In some examples, a first network entity 115 may receive a configuration to communicate with a second network entity 105. In some examples, the configuration may indicate a set of discontinuous active time periods for the second network entity 105 and a set of discontinuous inactive time periods for the second network entity 105. In some examples, the first network entity 115 may receive a configuration of a set of configured grant transmission occasions for uplink communications by the first network entity 115. In some examples, the first network entity 115 may communicate with the second network entity 105 during a first configured grant transmission occasion in accordance with a hybrid automatic repeat request (HARQ) process identifier, where the HARQ process identifier is based on a second configured grant transmission occasion of the set of configured grant transmission occasions that is invalid due to the second configured grant transmission occasion overlapping with a first discontinuous inactive time period of the set of discontinuous inactive time periods.

Figure 2:
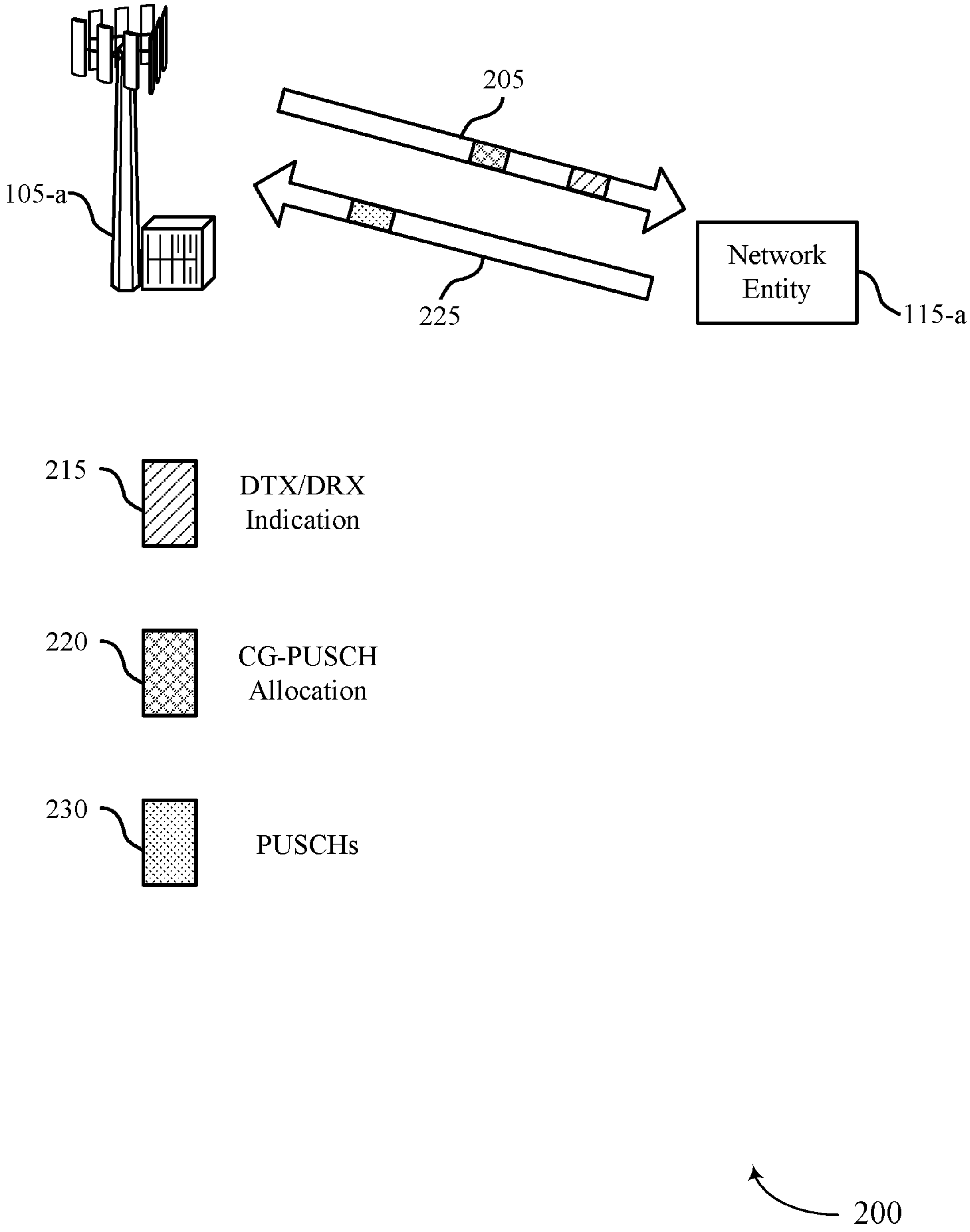

FIG. 2 shows an example of a wireless communications system 200 that supports techniques for determining a feedback identifier in an inactive communication period in accordance with one or more aspects of the present disclosure. In some examples, the wireless communications system 200 may implement or be implemented by aspects of the wireless communications system 100. For example, the wireless communications system 200 may include a first network entity 115-*a* (e.g., a UE) and a second network entity 105-*a*, which may be examples of the corresponding devices as described with reference to FIG. 1. FIG. 2 illustrates an example of the second network entity 105-*a* transmitting downlink signaling 205 including an indication 215 of a discontinuous cycle (e.g., DTX/DRX) and a CG-PUSCH allocation 220, to the first network entity 115-*a*. The first network entity 115-*a* may transmit uplink signaling 225 including one or more PUSCHs 230 based on the indication 215 and the CG-PUSCH allocation 220.

In some other wireless communications systems, a first network entity 115-*a* may determine an HPN for a first PUSCH (e.g., a first configured or valid PUSCH) of multiple PUSCHs (e.g., from a multiple PUSCH CG) based on a property of a retransmission timer (e.g., when the retransmission timer is not configured), a first offset (e.g., a non-zero offset based on RRC, $offset_1$), a second offset (e.g., a non-zero offset based on RRC or dynamic configuration signaling, $offset_2$), a current symbol of the transmission (e.g., a $CURRENT_{symbol}$), a periodicity of the CG-PUSCHs (e.g., a periodicity), a quantity of HARQ processes (e.g., a nrofHARQProcess), and the HPN, shown by Equation 1 or Equation 2 below.

$$HPN = \left[X * \text{floor}\left(\frac{\text{CURRENT symbol} - \text{offset}_1}{\text{periodicity}}\right) + \text{offset}_2\right] \text{ modulo } nrofHARQProcess \quad \text{Equation 1}$$

$$HPN = \left[X * \text{floor}\left(\frac{\text{CURRENT symbol} - \text{offset}_1}{\text{periodicity}}\right) + \text{offset}_2\right] \text{ modulo } nrofHARQProcess + harqProcID - \text{offset}_2 \quad \text{Equation 2}$$

With reference to Equation 1 and Equation 2, X may be equal to one, or may represent a quantity of configured PUSCHs in a CG period. Additionally, X may be inside or outside the floor operation in Equation 1 or Equation 2. In some other examples, the first network entity 115-*a* may determine the HPN of the remaining PUSCHs in the CG period based on incrementing the HPN of the preceding PUSCH in the CG period by an integer. In some aspects, the HPN of the remaining PUSCHs is based on modulo operation with the quantity of HARQ processes (e.g., as shown in Equation 1), or on modulo operation with a sum of the quantity of HARQ processes and the difference between the HPN and an offset (e.g., as shown in Equation 2).

In such wireless communications systems, a discontinuous cycle may impact the transmission of at least one PUSCH of the multiple CG-PUSCHs. The discontinuous cycle may align with TDD-UL/DL cycles, SSB periods, or other broadcast channels or signal periodicities. Some first network entity transmission or reception cycles (e.g., transmission and reception cycles associated with XR traffic) may include a non-integer period that may not align with other periodicities (TDD-UL/DL cycles, SSB periods, or the like). As such, in these wireless communications systems, a mismatch between the discontinuous cycle and a traffic pattern of the first network entity may occur. In some cases, the mismatch between a discontinuous cycle and the multiple CG-PUSCHs causes the first network entity to drop at least one of the PUSCHs of the multiple CG-PUCHs when the at least one PUSCH allocation falls outside the discontinuous active duration (e.g., the network entity may configure the CG-PUSCHs without considering the discontinuous cycle). In some other cases, Equation 1 and Equation 2 may not enable the first network entity 115-*a* to determine the HPN when at least one of the PUSCHs are dropped, and the first network entity 115-*a* and the second network entity 105-*a* may have different understandings of the HPN.

The wireless communications system 200 may support HPN determination of dropped PUSCHs. For example, the second network entity 105-*a* may transmit the indication 215 and the CG-PUSCH allocation 220 in the downlink signaling 205. The indication 215 may indicate active transmission and reception durations as well as inactive transmission and reception durations of the second network entity 105-*a*. In some examples, the CG-PUSCH allocation 220 allocates one or more PUSCHs 230 for the first network entity 115-*a* to transmit in the uplink signaling 225. In some cases, the one or more PUSCHs 230 may fall outside of the discontinuous active reception duration of the second network entity 105-*a*. In such cases, the first network entity 115-*a* may drop the one or more PUSCHs 230 (e.g., not transmit the one or more PUSCHs 230). In some aspects, the first network entity 115-*a* may determine the HPN of the dropped one or more PUSCHs 230 based on incrementing the HPN for the dropped one or more PUSCHs 230. Additionally, or alternatively, the first network entity 115-*a* may determine the HPN of the dropped one or more PUSCHs 230 based on not incrementing the HPN for the dropped one or more PUSCHs 230 (e.g., the HPN may exclude invalid configured one or more PUSCHs 230 based on the one or more PUSCHs 230 overlapping with the discontinuous inactive duration).

Figure 3:
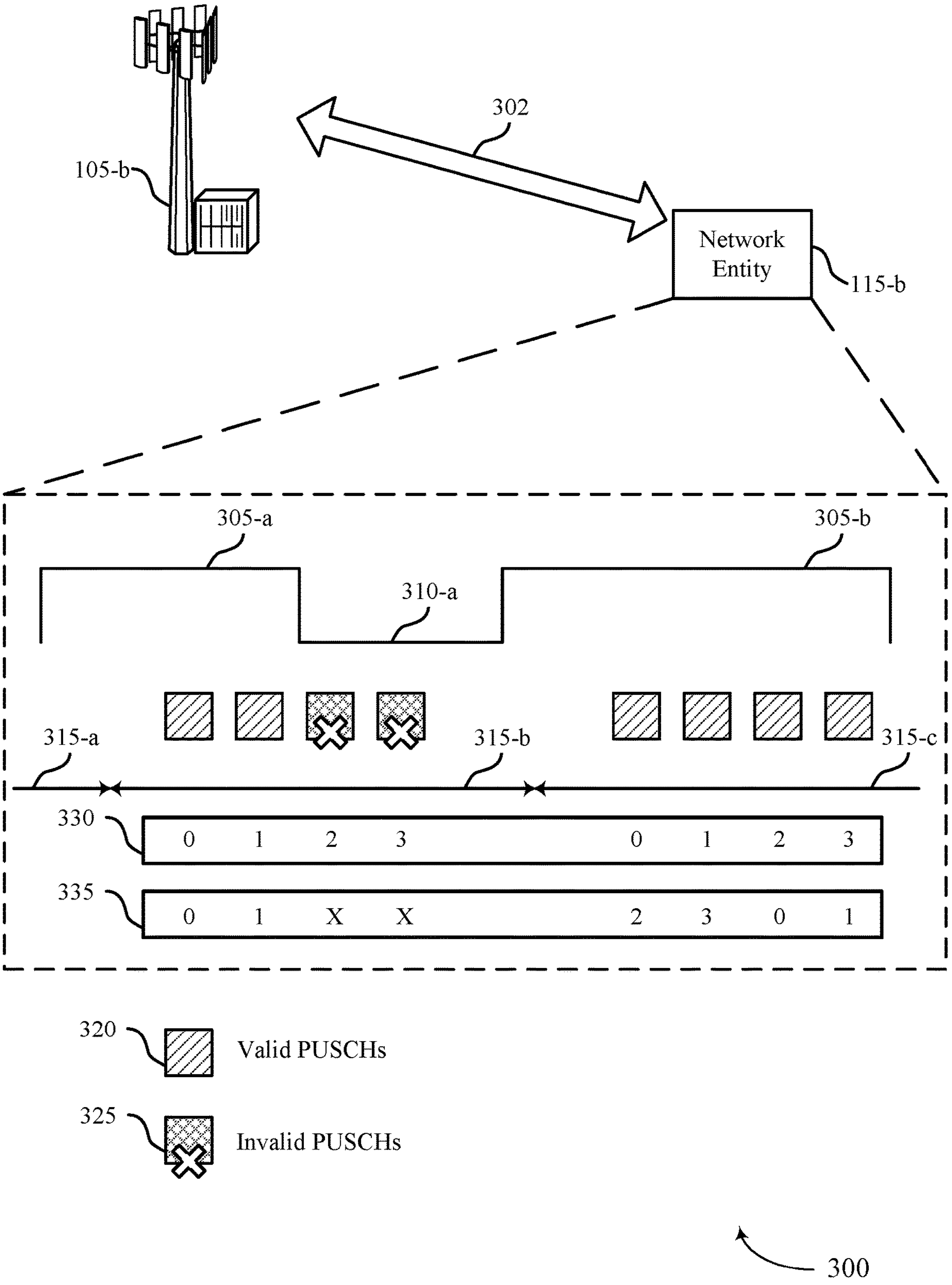

FIG. 3 shows an example of a wireless communications system 300 that supports techniques for determining a feedback identifier in an inactive communication period in accordance with one or more aspects of the present disclosure. In some examples, the wireless communications system 300 may implement or be implemented by aspects of the wireless communications systems 100 and 200. For example, the wireless communications system 300 may include one or more network entities (e.g., a second network entity 105-*b* and a first network entity 115-*b*), which may be examples of the corresponding devices as described with reference to FIGS. 1 and 2. FIG. 3. illustrates examples of HPN determination based on one or more dropped PUSCHs falling in a discontinuous inactive duration 310-*a* of the second network entity 105-*b*. FIG. 3 illustrates an example scenario of the last two PUSCHs of a multiple CG-PUSCH overlapping with the discontinuous inactive duration 310-*a*, but the systems, methods, and techniques discussed herein may apply to any scenario where one or more PUSCHs overlap with a discontinuous inactive duration 310.

As discussed further with reference to FIG. 2, the second network entity 105-*b* may allocate a multiple CG-PUSCH (e.g., the CG-PUSCH allocation 220) to the first network entity 115-*b* in signaling 302. The allocation may include an indication of a CG period 315 indicating a periodicity for the first network entity 115-*b* to transmit one or more PUSCHs of the multiple CG-PUSCH (e.g., a CG period 315-*a*, a CG period 315-*b*, or a CG period 315-*c*). The first network entity 115-*b* may consider the one or more PUSCHs to be one or more valid PUSCHs 320 or one or more invalid PUSCHs 325 based on whether the one or more PUSCHs fall in a discontinuous active duration 305 or the discontinuous inactive duration 310-*a* respectively. In some aspects, the discontinuous active duration 305 and the discontinuous inactive duration 310-*a* are indicated by the second network entity 105-*b* in the signaling 302 (e.g., the indication 215). For example, the first network entity 115-*b* may consider the two PUSCHs that fall in the discontinuous active duration 305-*a* during the CG period 315-*b*, and the four PUSCHs that fall in the discontinuous active duration 305-*b* during the CG period 315-*c* to be one or more valid PUSCHs 320 (e.g., the first network entity 115-*b* may transmit the one or more PUSCHs). In some aspects, the first network entity 115-*b* may consider the two PUSCHs that fall in the discontinuous inactive duration 310-*a* during the CG period 315-*b* to be one or more invalid PUSCHs 325 (e.g., the first network entity 115-*b* may not transmit the one or more PUSCHs).

The first network entity 115-*b* may support HPN determination of the one or more invalid PUSCHs 325 (e.g., dropped PUSCHs) in the discontinuous inactive duration 310-*a*. In some examples, HPNs (e.g., 0, 1, 2, 3 in a first option 330 or a second option 335) are different for an adjacent CG period 315. Additionally, or alternatively, the HPNs are different in the same CG period 315. The different HPNs may enable the second network entity 105-*b* to configure a retransmission in the signaling 302 for an early CG-PUSCH in the next CG period 315 (e.g., in vicinity of CG-PUSCH in next CG period).

In some examples, the first network entity 115-*b* increments the HPN for the one or more invalid PUSCHs 325 in accordance with the first option 330. For example, the first network entity 115-*b* increments the HPN for each PUSCH in the CG period 315-*b*, including two of the one or more invalid PUSCHs 325. In some examples, the first network entity 115-*b* operates in the first option 330 based on the second network entity 105-*b* disabling a retransmission timer or based on enabling a HARQ option (e.g., the first network entity 115-*b* may not expect retransmissions and HARQ option B may be enabled). For example, XR applications may have a relatively small delay budget (e.g., retransmission-less CG). Additionally, or alternatively, the first network entity 115-*b* operates in the first option 330 based on a quantity of retransmissions satisfying a quantity threshold (e.g., the quantity of retransmissions may be relatively limited for a tighter packet delay budget (PDB)). In some examples, a quantity of the HPN the first network entity 115-*b* increments is increased to provide a larger duration gap between the same HPNs (e.g., the HPN may increment to 8 before starting at 0, providing a larger gap between each same HPN). In some aspects, the first network entity 115-*b* operates in the first option 330 based on a quantity of the one or more invalid PUSCHs 325 surpassing a threshold. For example, the second network entity 105-*b* may configure the discontinuous cycle semi-statically and the second network entity 105-*b* and the first network entity 115-*b* may know the quantity of the one or more invalid PUSCHs 325 beforehand.

Additionally, or alternatively, the first network entity 115-*b* may not increment the HPN for the one or more invalid PUSCHs 325 in accordance with the second option 335. The first network entity 115-*b* may skip the increment of the HPN for the two of the one or more invalid PUSCHs 325 in the CG period 315-*b* and resume the increment of the HPN for the one or more valid PUSCHs 320 in the CG period 315-*c*. In some aspects, a gap between HARQ processes with the same HPN may be relatively larger than in other systems (e.g., there are five HARQ processes between the HPN 1 in the CG period 315-*b* and the HPN 1 in the CG period 315-*c*). In such aspects, the gap between the same HPN may support more flexible scheduling for the second network entity 105-*b* to schedule retransmissions in the signaling 302. For example, the discontinuous active duration 305 and the discontinuous inactive duration 310 may dynamically change. The second network entity 105-*b* or the first network entity 115-*b* may record (e.g., bookkeep in a codebook or a log) the one or more invalid PUSCHs 325 (e.g., a quantity of all skipped PUSCHs). In some aspects, the first network entity 115-*b* may operate in the second option 335 based on a skipping indication in a UCI skipping indication. For example, the skipping indication indicates a quantity of the one or more invalid PUSCHs 325.

The first network entity 115-*b* may operate in the first option 330 or the second option 335 for incrementing the HPN for time division duplex (TDD) configurations with subband full-duplex (SBFD). For example, the first network entity 115-*b* may drop the one or more invalid PUSCHs 325 on SBFD slots (e.g., based on one or more PUSCHs coinciding on SBFD slots and some on non-SBFD slots). In some cases, the first network entity 115-*b* does not indicate dropping the one or more invalid PUSCHs 325 in the UCI skipping indication.

In some cases, the second network entity 105-*b* may schedule the first network entity 115-*b* to send a transmission of CG-PUSCH in a next discontinuous active duration 305 if the discontinuous cycle satisfies a threshold (e.g., for typical augmented reality periodicity (16.66 ms) and PDB (30 ms), the discontinuous active duration 305 may match 16.66 ms for uplink or downlink video periodicity). In such cases, the first network entity 115-*b* may not assign a same HPN to two CG transmission occasions in two discontinuous cycles. A quantity of configured HPNs may reduce (e.g., be minimized) under a condition that the same HPN is not associated with the two CG transmission occasions in two discontinuous cycles. In some aspects, the second network entity 105-*b* may transmit configuration signaling in the signaling 302 indicating an additional discontinuous active duration 305, as discussed further with reference to FIG. 4.

Figure 4:
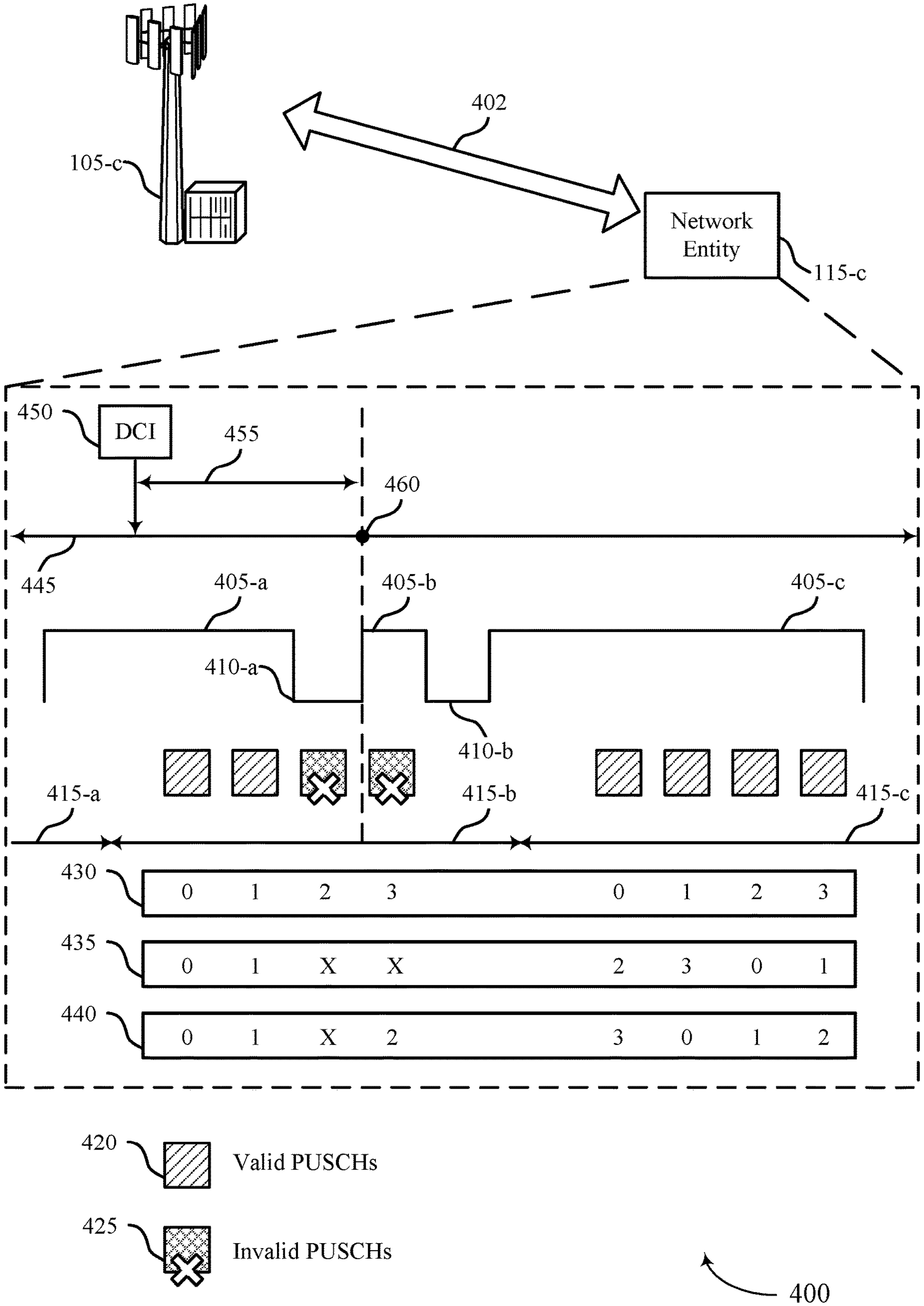

FIG. 4 shows an example of a wireless communications system 400 that supports techniques for determining a feedback identifier in an inactive communication period in accordance with one or more aspects of the present disclosure. In some examples, the wireless communications system 400 may implement or be implemented by aspects of the wireless communications systems 100 and 200. For example, the wireless communications system 400 may include one or more network entities 105 (e.g., a second network entity 105-*c* and a first network entity 115-*c*), which may be examples of the corresponding devices as described with reference to FIGS. 1 through 3. FIG. 4 illustrates an example of HPN determination for an additional discontinuous active duration 405-*b* (e.g., in addition to a discontinuous active duration 405-*a* and a discontinuous active duration 405-*c* indicated in signaling 402).

The second network entity 105-*c* may not transmit or receive communications on physical channels during the discontinuous inactive duration 410 (e.g., so that the second network entity 105-*c* may sleep for network power savings). However, in some aspects, the first network entity 115-*c* may be scheduled or otherwise configured to receive or transmit signals or communications on channels via the signaling 402 during the discontinuous inactive duration 410 (e.g., during a CG period 415-*a*, a CG period 415-*b*, or a CG period 415-*c*). For example, the signals or channel transmissions may include SSB transmissions, PDCCH transmissions, PDSCH transmissions (e.g., for paging), PDCCH transmissions, PDSCH transmissions (e.g., for system information), or RACH related channel transmissions. Additionally, or alternatively, the first network entity 115-*c* may not receive or transmit signals via the signaling 402 during the discontinuous inactive duration 410. For example, the first network entity 115-*c* may not receive or transmit CG PUSCH, SPS, PUCCH, PUSCH, or SCI-RS (e.g., periodic or semi-persistent CSI-RS for CSI report).

In some aspects, the second network entity 105-*c* activates or deactivates the discontinuous inactive duration 410 and the discontinuous active duration 405, enabling the additional discontinuous active duration 405-*b*. For example, the second network entity 105-*c* may enable the additional discontinuous active duration 405-*b* based on the signals or channels the second network entity 105-*c* may transmit or receive during the discontinuous inactive duration 410 (e.g., L1 signaling, SSB transmissions, or RACH transmissions). The second network entity 105-*c* may provide the additional discontinuous active duration 405-*b* dynamically or semi-statically within the discontinuous inactive duration 410. For example, the second network entity 105-*c* provides the additional discontinuous active duration 405-*b* between the discontinuous inactive duration 410-*a* and the discontinuous inactive duration 410-*b*.

The first network entity 115-*c* may consider one or more invalid PUSCHs 425 to be one or more valid PUSCHs 420 based on the additional discontinuous active duration 405-*b* (e.g., the first network entity 115-*c* may consider the third PUSCH in the CG period 415-*b* to be invalid until receiving the additional discontinuous active duration 405-*b*). In some aspects, the first network entity 115-*c* supports HPN determination of one or more invalid PUSCHs 425 (e.g., dropped PUSCHs) in the additional discontinuous active duration 405-*b*. For example, the first network entity 115-*c* supports a first option 430 of HPN determination and a second option 435 of HPN determination, as discussed with reference to the first option 330 and the second option 335 in FIG. 3. Additionally, or alternatively, the first network entity 115-*c* may support a third option 440 of HPN determination.

In some cases, the second network entity 105-*c* signals the additional discontinuous active duration 405-*b* via DCI 450 in the signaling 402. A time 460 may indicate the beginning of the additional discontinuous active duration 405-*b*. The first network entity 115-*c* may operate in the first option 430, the second option 435, or the third option 440 based on a threshold duration 455 associated with the DCI 450 and the time 460.

In some examples, the first network entity 115-*c* receives the DCI 450 at a duration satisfying the threshold duration 455. The first network entity 115-*c* may operate in the third option 440 of HPN determination based on satisfying the threshold duration 455 (e.g., the first network entity 115-*c* received the DCI a minimum offset between the dynamic extension signaling and the dropping of the one or more invalid PUSCHs 425). Additionally, or alternatively, the first network entity 115-*c* may operate in the third option based on the second network entity 105-*c* transmitting the DCI 450 for SSB transmission or RACH. In some aspects, the first network entity 115-*c* transmits the one or more invalid PUSCHs 425 that fall in the additional discontinuous active duration 405-*b* and increments the HPN (e.g., the first network entity 115-*c* refrain from incrementing the HPN for the one or more invalid PUSCHs 425 that fall in the discontinuous inactive duration 410-*a*).

Additionally, or alternatively, the first network entity 115-*c* may not operate in the third option 440 when the duration satisfies the threshold duration 445 based on the second network entity 105-*c* transmitting the DCI 450 for transmissions other than SSB transmissions or RACH transmissions. For example, the first network entity 115-*c* may not consider the one or more invalid PUSCHs 425 in the additional discontinuous active duration 405-*b* to be valid even if the threshold duration 455 is satisfied. In such cases, the first network entity 115-*c* operates in the first option 430 or the second option 435.

In some examples, the first network entity 115-*c* threshold duration 455 is not satisfied. The first network entity 115-*c* may not reactivate the one or more invalid PUSCHs 425 in the additional discontinuous active duration 405-*b* based on the duration not satisfying the threshold duration 455. In some aspects, the first network entity 115-*c* operates in the first option 430 or the second option 435 based on the duration not satisfying the threshold duration 455.

Figure 5:
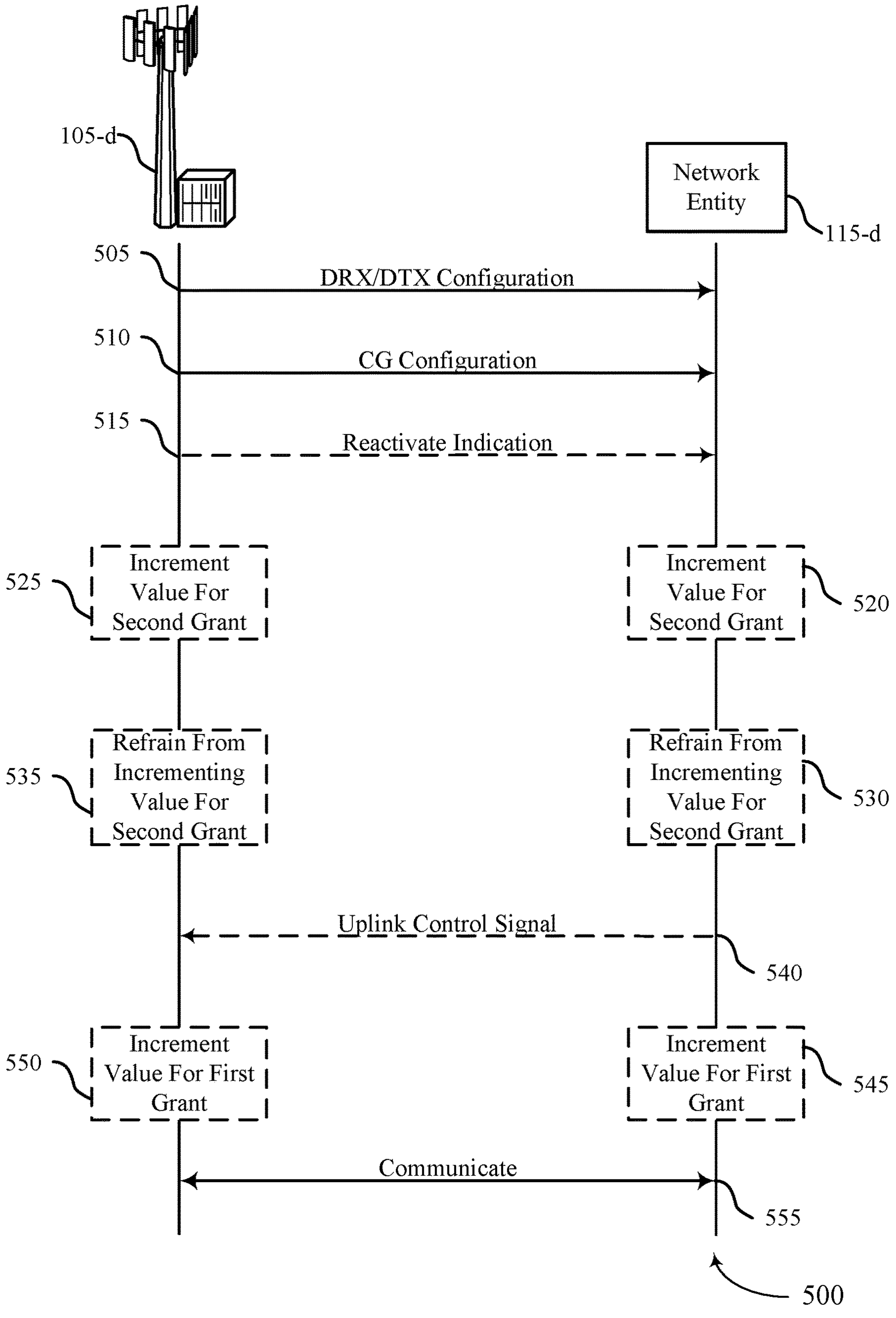
FIG. 5 shows an example of a process flow that supports techniques for determining a feedback identifier in an inactive communication period in accordance with one or more aspects of the present disclosure.

FIG. 5 shows an example of a process flow 500 that supports techniques for determining a feedback identifier in an inactive communication period in accordance with one or more aspects of the present disclosure. The process flow 500 may be performed by aspects of the wireless communications system 100 or the wireless communications system 200, as described herein with reference to FIGS. 1 and 2. For example, a first network entity 115-*d* and a second network entity 105-*d*, which may be examples of a first network entity 105 and a second network entity 105 as described herein, may perform aspects of the process flow 500. In the following description of the process flow 500, operations performed by the first network entity 115-*d* and the second network entity 105-*d* may be performed in a different order than is shown. Some operations may be omitted from the process flow 500, and other operations may be added to the process flow 500. Further, although some operations or signaling may be shown to occur at different times for discussion purposes, these operations may occur at the same time.

At 505, the first network entity 115-*d* may receive a configuration (e.g., a DTX/DRX configuration) to communicate with the second network entity 105-*d*. The configuration may indicate multiple discontinuous active time periods (e.g., durations) and multiple discontinuous inactive time periods for the second network entity 105-*d*. At 510, the first network entity 115-*d* may receive a configuration of multiple CG transmission occasions for uplink communications (e.g., PUSCHs) by the first network entity 115-*d*. A second CG transmission occasion of the multiple CG transmission occasions may be invalid due to the second CG transmission occasion overlapping with a first discontinuous inactive time period of the multiple discontinuous inactive time periods.

In some examples, at 515, the first network entity 115-*d* may optionally receive an indication to reactivate the second CG transmission occasion scheduled to be invalid due to overlapping with the first discontinuous inactive time period. In some cases, at 520, the first network entity 115-*d* may increment a value for a HARQ process identifier (e.g., HPN) corresponding to the second CG transmission occasion based on a time difference between receipt of the indication and the second CG transmission occasion satisfying a threshold (e.g., a minimum time offset between the indication and the second CG transmission). Additionally, or alternatively, the first network entity 115-*d* may increment the value for the HARQ process identifier corresponding to the second CG transmission occasion based on an activation purpose corresponding to the indication that is an SSB transmission or a RACH transmission.

In some examples, the first network entity 115-*d* may increment the value for the HARQ process identifier corresponding to the second CG transmission occasion irrespective of the second CG transmission occasion that is invalid due to overlapping with the first discontinuous inactive time period (e.g., as further discussed with reference to the first option 330 in FIG. 3). The first network entity 115-*d* may increment the value for the HARQ process identifier corresponding to the second CG transmission occasion based on at least one of a retransmission timer that is disabled, a HARQ option that is enabled, a threshold quantity of allowed retransmissions, or a quantity of dropped transmission occasions.

In some examples, at 525, the second network entity 105-*d* may increment a value for a HARQ process identifier (e.g., HPN) corresponding to the second CG transmission occasion based on a time difference between receipt of the indication and the second CG transmission occasion satisfying a threshold (e.g., a minimum time offset between the indication and the second CG transmission). Additionally, or alternatively, the second network entity 105-*d* may increment the value for the HARQ process identifier corresponding to the second CG transmission occasion based on an activation purpose corresponding to the indication that is an SSB transmission or a RACH transmission. In some examples, the second network entity 105-*d* may increment the value for the HARQ process identifier corresponding to the second CG transmission occasion irrespective of the second CG transmission occasion that is invalid due to overlapping with the first discontinuous inactive time period (e.g., as further discussed with reference to the first option 330 in FIG. 3). The second network entity 105-*d* may increment the value for the HARQ process identifier corresponding to the second CG transmission occasion based on at least one of a retransmission timer that is disabled, a HARQ option that is enabled, a threshold quantity of allowed retransmissions, or a quantity of dropped transmission occasions.

In some cases, at 530, the first network entity 115-*d* may refrain from incrementing the value for the HARQ process identifier corresponding to the second CG transmission occasion based on the second CG transmission that is invalid due to overlapping with the first discontinuous inactive time period (e.g., as further discussed with reference to the second option 335 in FIG. 3). The first network entity 115-*d* may refrain from incrementing the value for the HARQ process identifier corresponding to the second CG transmission occasion based on a time difference between receipt of the indication and the second CG transmission occasion satisfying a threshold and an activation purpose corresponding to the indication that is other than an SSB transmission or a RACH transmission.

In some examples, at 535, the second network entity 105-*d* refrains from incrementing the value for the HARQ process identifier corresponding to the second CG transmission occasion based on the second CG transmission that is invalid due to overlapping with the first discontinuous inactive time period (e.g., as further discussed with reference to the second option 335 in FIG. 3). In some aspects, the second network entity 105-*d* refrains from incrementing the value for the HARQ process identifier corresponding to the second CG transmission occasion based on a time difference between receipt of the indication and the second CG transmission occasion satisfying a threshold and an activation purpose corresponding to the indication that is other than an SSB transmission or a RACH transmission.

At 540, the first network entity 115-*d* may transmit an uplink control signal that indicates that a quantity of transmission occasions are invalid due to overlapping with one or more of the multiple discontinuous inactive time periods. In some examples, the first network entity 115-*d* refrains from incrementing the value for the HARQ process identifier corresponding to the second CG transmission occasion based on transmitting the uplink control signal that indicates the quantity of transmission occasions. In some cases, at 545, the first network entity 115-*d* increments the value for the HARQ process identifier corresponding to a first CG transmission occasion occurring after the second CG transmission occasion. At 550, the second network entity 105-*d* may increment the value for the HARQ process identifier corresponding to the first CG transmission occasion occurring after the second CG transmission occasion.

At 555, the first network entity 115-*d* may communicate with the second network entity 105-*d* during the first CG transmission occasion in accordance with the HARQ process identifier. In some cases, the HARQ process identifier is based on the second CG transmission occasion of the multiple CG occasions that is invalid due to the second CG transmission occasion overlapping with the first discontinuous inactive time period of the multiple discontinuous inactive time periods.

Figure 6:
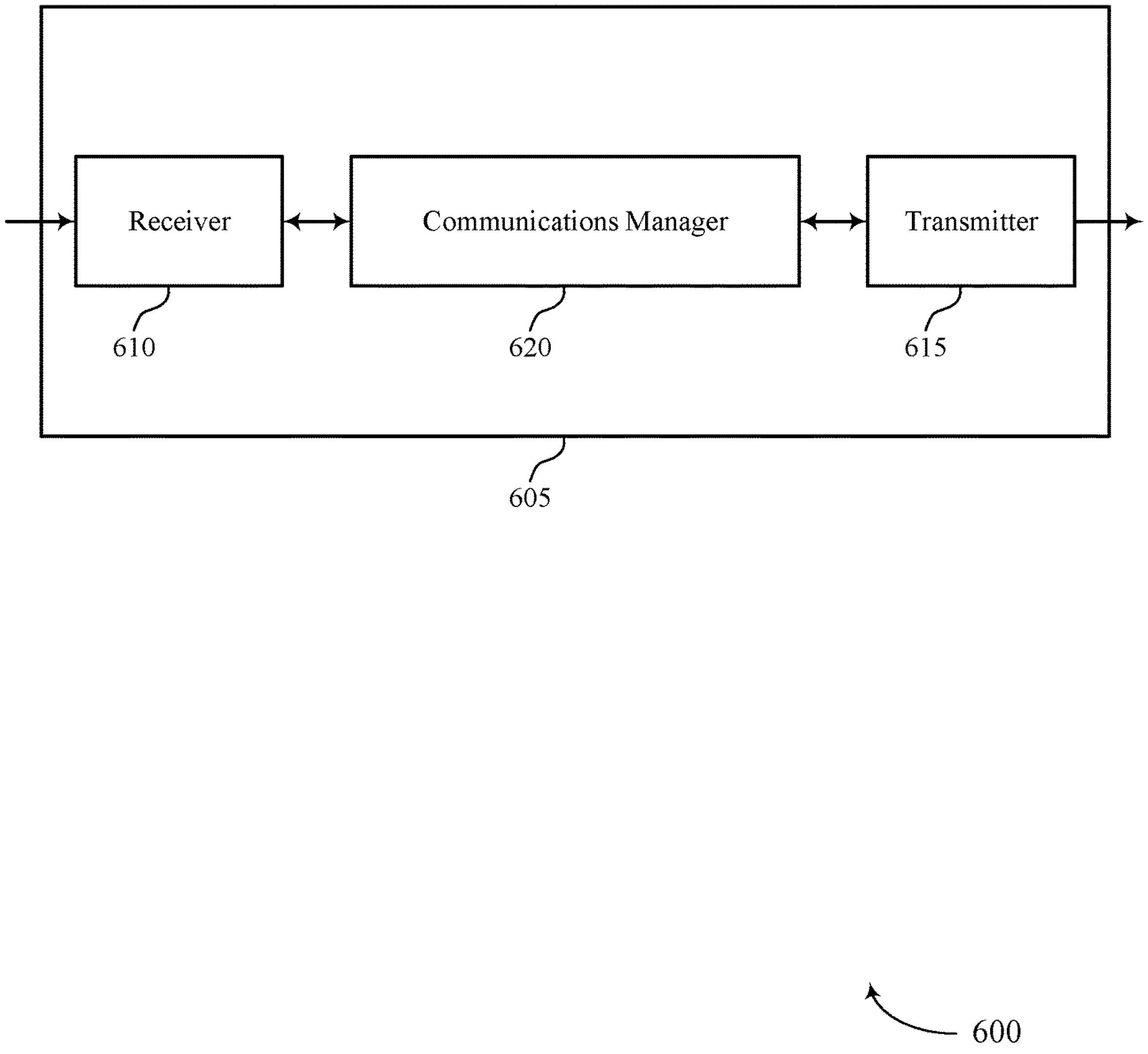
FIGS. 6 and 7 show block diagrams of devices that support techniques for determining a feedback identifier in an inactive communication period in accordance with one or more aspects of the present disclosure.

FIG. 6 shows a block diagram 600 of a device 605 that supports techniques for determining a feedback identifier in an inactive communication period in accordance with one or more aspects of the present disclosure. The device 605 may be an example of aspects of a first network entity 115 (e.g., UE) as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for determining a feedback identifier in an inactive communication period). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for determining a feedback identifier in an inactive communication period). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for determining a feedback identifier in an inactive communication period as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 is capable of, configured to, or operable to support a means for receiving a configuration for communicating with a second network entity, where the configuration indicates a set of multiple discontinuous active time periods for the second network entity and a set of multiple discontinuous inactive time periods for the second network entity. The communications manager 620 is capable of, configured to, or operable to support a means for receiving a configuration of a set of multiple configured grant transmission occasions for uplink communications by the first network entity. The communications manager 620 is capable of, configured to, or operable to support a means for communicating with the second network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, and more efficient utilization of communication resources.

Figure 7:
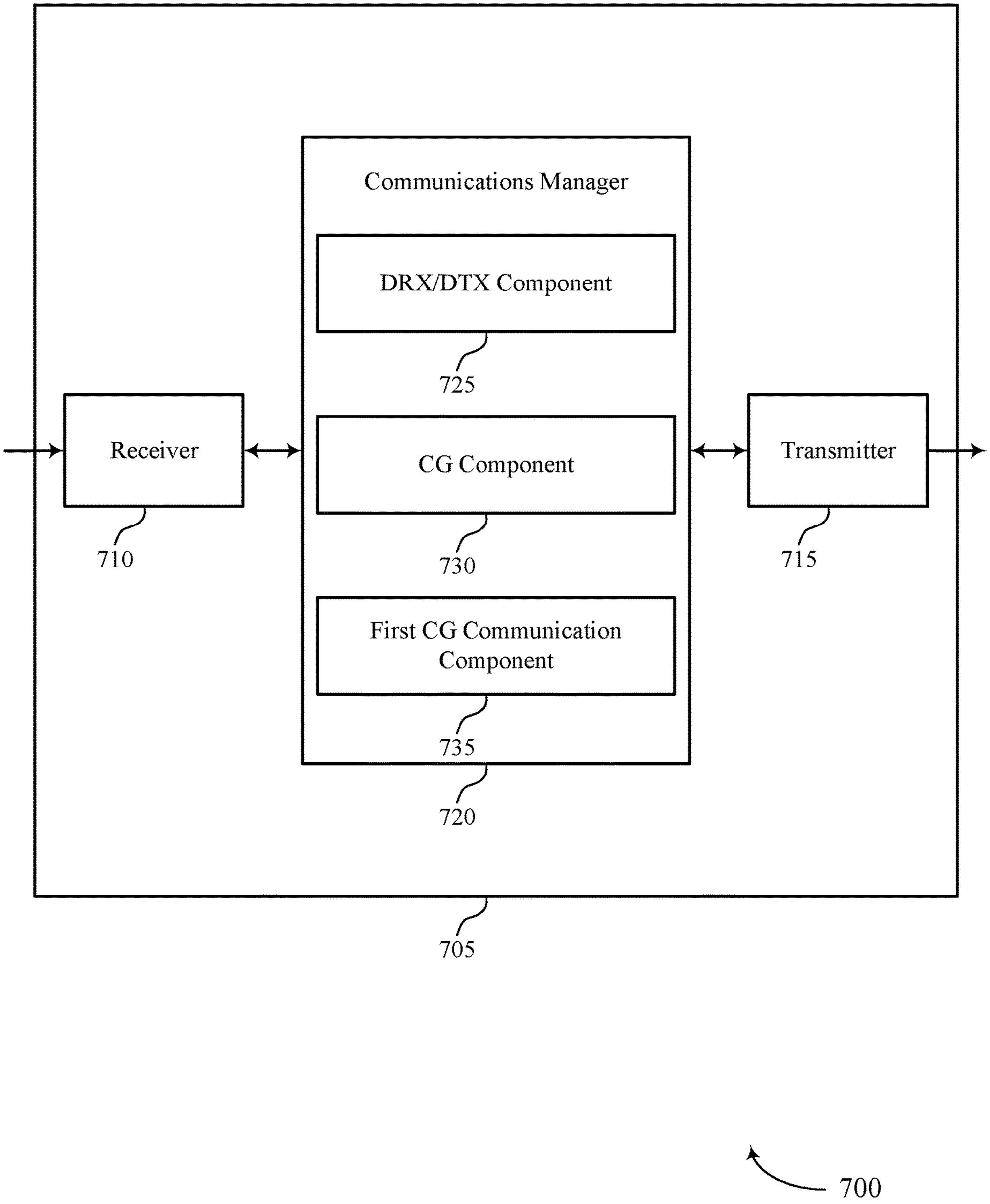

FIG. 7 shows a block diagram 700 of a device 705 that supports techniques for determining a feedback identifier in an inactive communication period in accordance with one or more aspects of the present disclosure. The device 705 may be an example of aspects of a device 605 or a first network entity 115 (e.g., UE 115) as described herein. The device 705 may include a receiver 710, a transmitter 715, and a communications manager 720. The device 705, or one of more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for determining a feedback identifier in an inactive communication period). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for determining a feedback identifier in an inactive communication period). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for determining a feedback identifier in an inactive communication period as described herein. For example, the communications manager 720 may include a DRX/DTX Component 725, a CG Component 730, a First CG Communication Component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The DRX/DTX Component 725 is capable of, configured to, or operable to support a means for receiving a configuration for communicating with a second network entity, where the configuration indicates a set of multiple discontinuous active time periods for the second network entity and a set of multiple discontinuous inactive time periods for the second network entity. The CG Component 730 is capable of, configured to, or operable to support a means for receiving a configuration of a set of multiple configured grant transmission occasions for uplink communications by the first network entity. The First CG Communication Component 735 is capable of, configured to, or operable to support a means for communicating with the second network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

Figure 8:
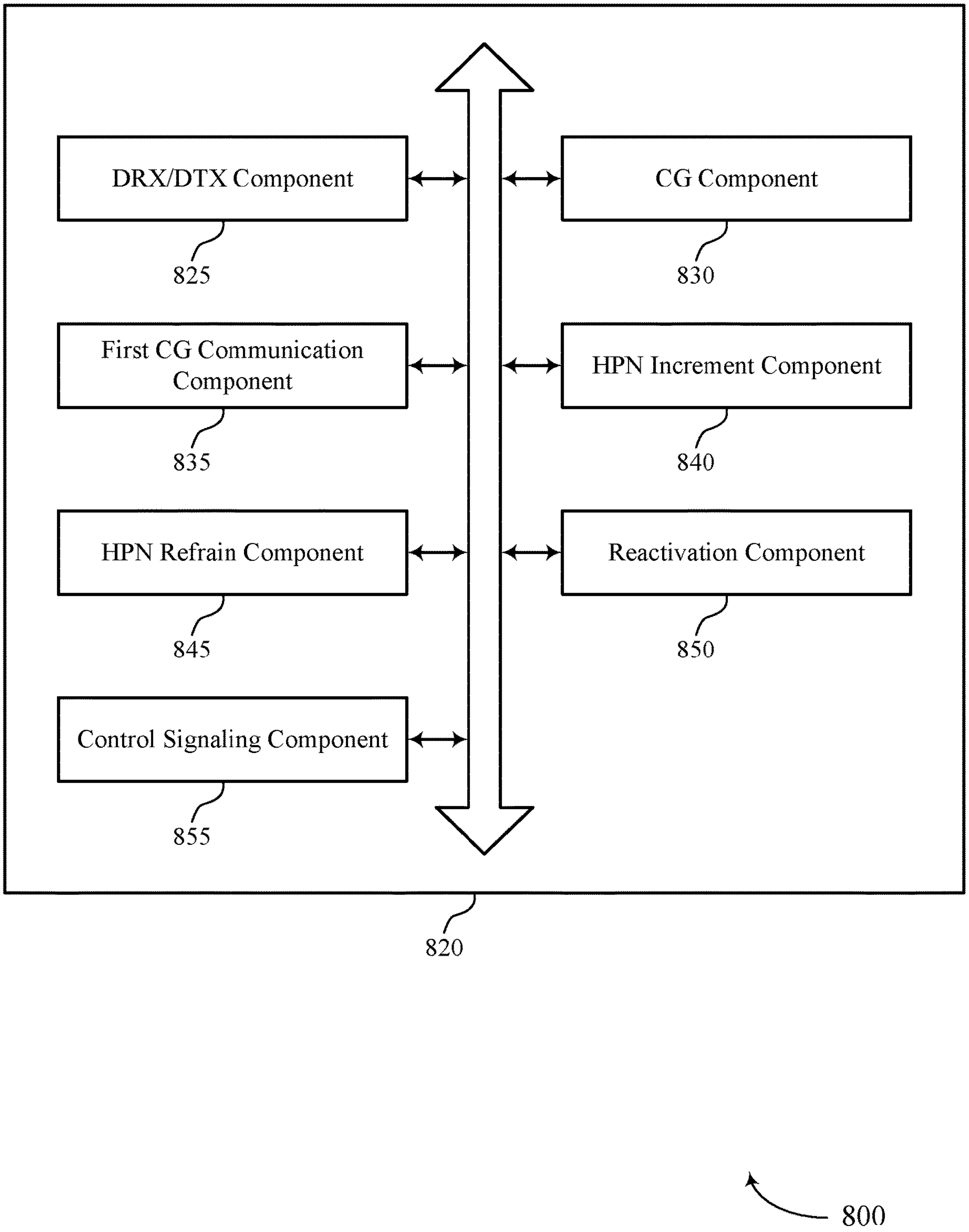
FIG. 8 shows a block diagram of a communications manager that supports techniques for determining a feedback identifier in an inactive communication period in accordance with one or more aspects of the present disclosure.

FIG. 8 shows a block diagram 800 of a communications manager 820 that supports techniques for determining a feedback identifier in an inactive communication period in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for determining a feedback identifier in an inactive communication period as described herein. For example, the communications manager 820 may include a DRX/DTX Component 825, a CG Component 830, a First CG Communication Component 835, an HPN Increment Component 840, an HPN Refrain Component 845, a Reactivation Component 850, a Control Signaling Component 855, or any combination thereof. Each of these components, or components or subcomponents thereof (e.g., one or more processors, one or more memories), may communicate, directly or indirectly, with one another (e.g., via one or more buses).

The DRX/DTX Component 825 is capable of, configured to, or operable to support a means for receiving a configuration for communicating with a second network entity, where the configuration indicates a set of multiple discontinuous active time periods for the second network entity and a set of multiple discontinuous inactive time periods for the second network entity. The CG Component 830 is capable of, configured to, or operable to support a means for receiving a configuration of a set of multiple configured grant transmission occasions for uplink communications by the first network entity. The First CG Communication Component 835 is capable of, configured to, or operable to support a means for communicating with the second network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

In some examples, the HPN Increment Component 840 is capable of, configured to, or operable to support a means for incrementing a value for the HARQ process identifier corresponding to the second configured grant transmission occasion irrespective of the second configured grant transmission occasion that is invalid due to overlapping with the first discontinuous inactive time period.

In some examples, incrementing the value for the HARQ process identifier corresponding to the second configured grant transmission occasion is based on at least one of a retransmission timer that is disabled, a feedback mode that is enabled, a threshold quantity of allowed retransmissions, a quantity of dropped transmission occasions, or a combination thereof.

In some examples, the HPN Refrain Component 845 is capable of, configured to, or operable to support a means for refraining from incrementing a value for the HARQ process identifier corresponding to the second configured grant transmission occasion based on the second configured grant transmission occasion that is invalid due to overlapping with the first discontinuous inactive time period.

In some examples, the HPN Increment Component 840 is capable of, configured to, or operable to support a means for incrementing the value for the HARQ process identifier corresponding to the first configured grant transmission occasion occurring after the second configured grant transmission occasion.

In some examples, the Control Signaling Component 855 is capable of, configured to, or operable to support a means for transmitting an uplink control signal indicating that a quantity of transmission occasions are invalid due to overlapping with one or more of the set of multiple discontinuous inactive time periods, where to refrain from incrementing the value for the HARQ process identifier corresponding to the second configured grant transmission occasion is based on transmitting the uplink control signal that indicates the quantity of transmission occasions.

In some examples, the Reactivation Component 850 is capable of, configured to, or operable to support a means for receiving an indication to reactivate the second configured grant transmission occasion scheduled to be invalid due to overlapping with the first discontinuous inactive time period.

In some examples, the HPN Increment Component 840 is capable of, configured to, or operable to support a means for incrementing a value for the HARQ process identifier corresponding to the second configured grant transmission occasion based on a time difference between receipt of the indication and the second configured grant transmission occasion satisfying a threshold.

In some examples, the HPN Increment Component 840 is capable of, configured to, or operable to support a means for incrementing a value for the HARQ process identifier corresponding to the second configured grant transmission occasion based on an activation purpose corresponding to the indication that is a synchronization signal block transmission or a random access channel transmission.

In some examples, the HPN Refrain Component 845 is capable of, configured to, or operable to support a means for refraining from incrementing a value for the HARQ process identifier corresponding to the second configured grant transmission occasion based on a time difference between receipt of the indication and the second configured grant transmission occasion satisfying a threshold and an activation purpose corresponding to the indication that is other than a synchronization signal block transmission or a random access channel transmission.

Figure 9:
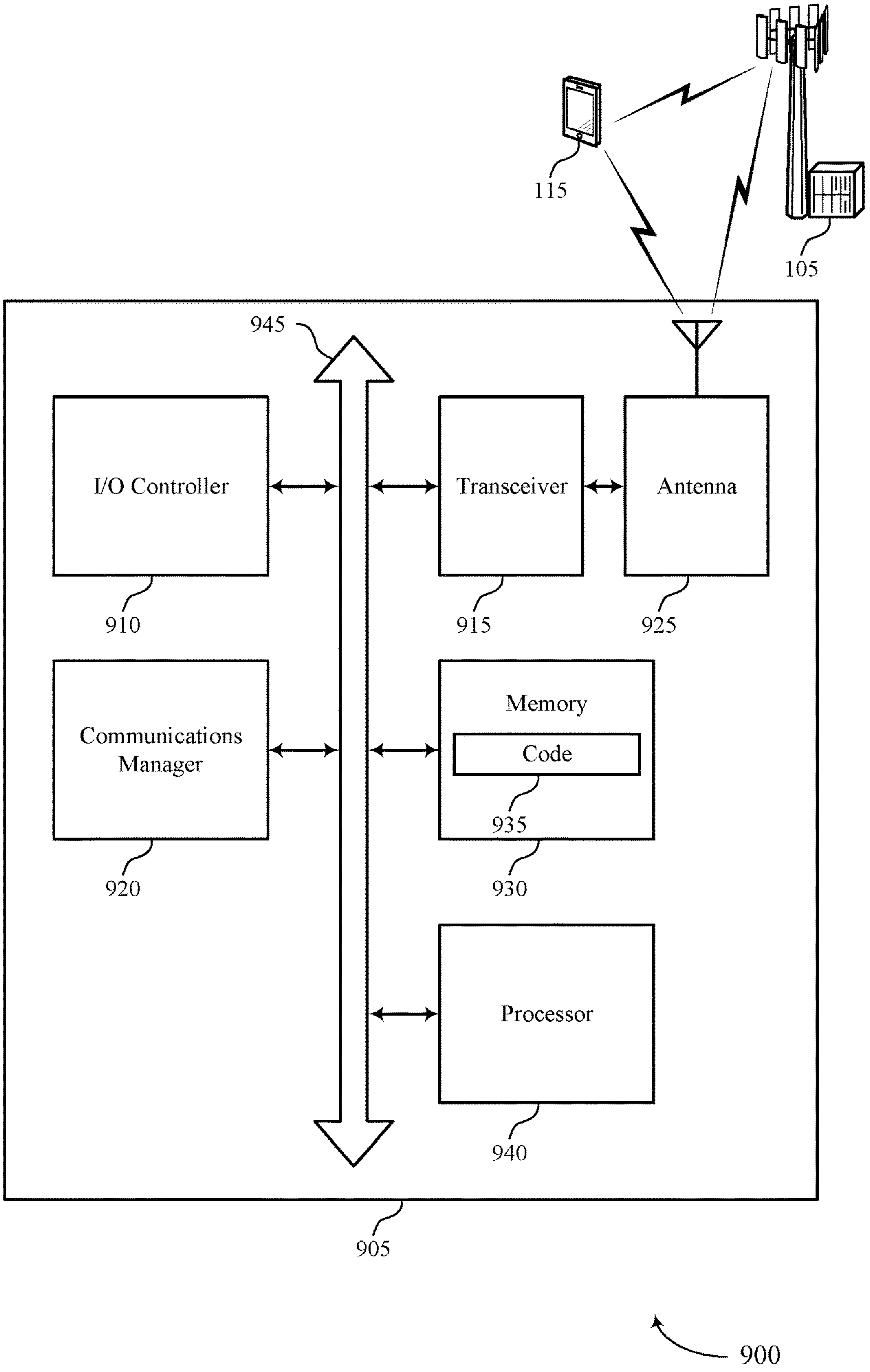
FIG. 9 shows a diagram of a system including a device that supports techniques for determining a feedback identifier in an inactive communication period in accordance with one or more aspects of the present disclosure.

FIG. 9 shows a diagram of a system 900 including a device 905 that supports techniques for determining a feedback identifier in an inactive communication period in accordance with one or more aspects of the present disclosure. The device 905 may be an example of or include the components of a device 605, a device 705, or a first network entity 115 (e.g., UE 115) as described herein. The device 905 may communicate (e.g., wirelessly) with one or more network entities 105, one or more first network entities 105, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting techniques for determining a feedback identifier in an inactive communication period). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

For example, the communications manager 920 is capable of, configured to, or operable to support a means for receiving a configuration for communicating with a second network entity, where the configuration indicates a set of multiple discontinuous active time periods for the second network entity and a set of multiple discontinuous inactive time periods for the second network entity. The communications manager 920 is capable of, configured to, or operable to support a means for receiving a configuration of a set of multiple configured grant transmission occasions for uplink communications by the first network entity. The communications manager 920 is capable of, configured to, or operable to support a means for communicating with the second network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of techniques for determining a feedback identifier in an inactive communication period as described herein, or the at least one processor 940 and the at least one memory 930 may be otherwise configured to, individually or collectively, perform or support such operations.

Figure 10:
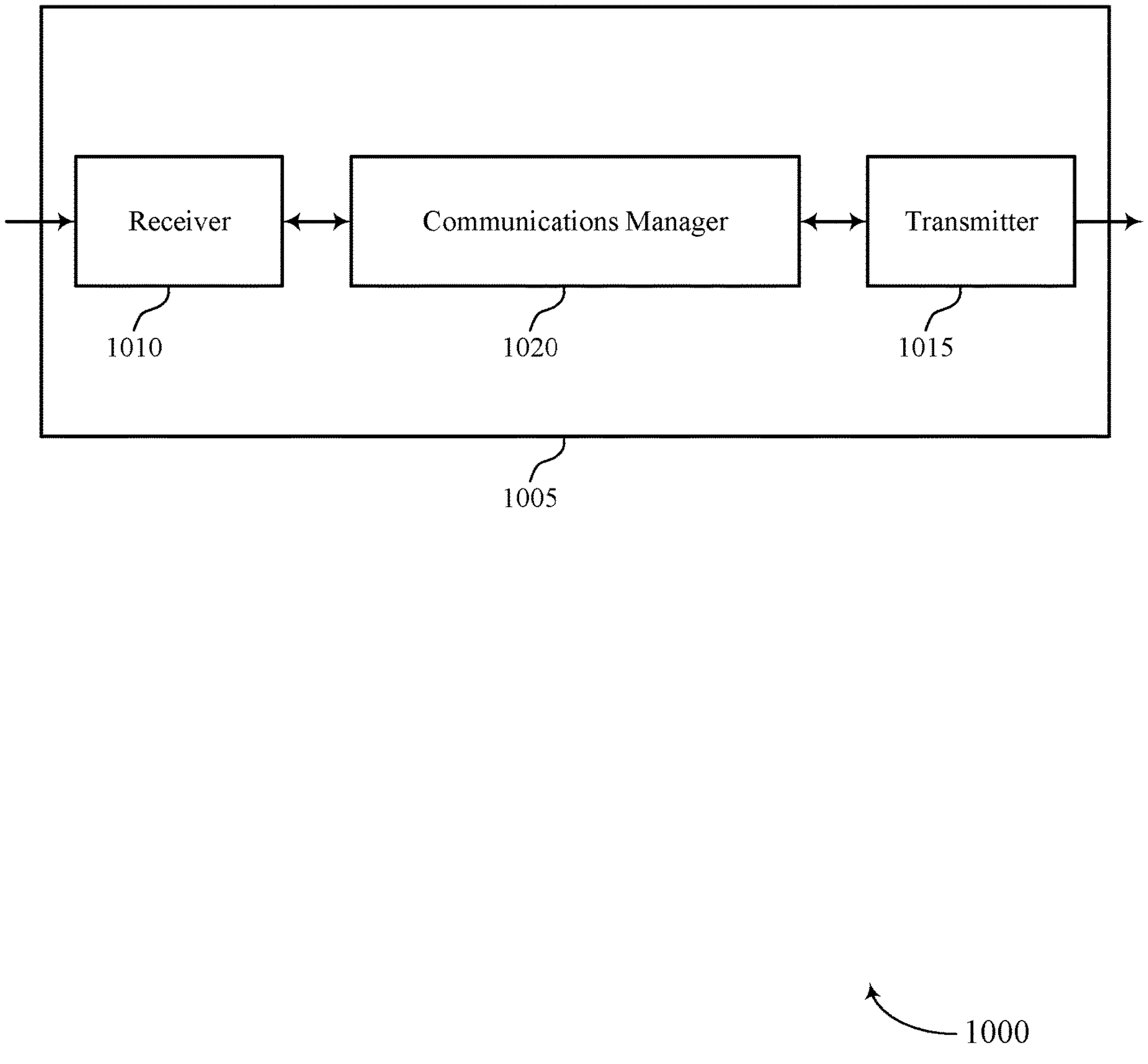
FIGS. 10 and 11 show block diagrams of devices that support techniques for determining a feedback identifier in an inactive communication period in accordance with one or more aspects of the present disclosure.

FIG. 10 shows a block diagram 1000 of a device 1005 that supports techniques for determining a feedback identifier in an inactive communication period in accordance with one or more aspects of the present disclosure. The device 1005 may be an example of aspects of a network entity 105 as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for determining a feedback identifier in an inactive communication period as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 is capable of, configured to, or operable to support a means for outputting, to a first network entity, a configuration for communicating with the second network entity, where the configuration indicates a set of multiple discontinuous active time periods for the second network entity and a set of multiple discontinuous inactive time periods for the second network entity. The communications manager 1020 is capable of, configured to, or operable to support a means for outputting a configuration of a set of multiple configured grant transmission occasions for uplink communications by the first network entity. The communications manager 1020 is capable of, configured to, or operable to support a means for communicating with the first network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, and more efficient utilization of communication resources.

Figure 11:
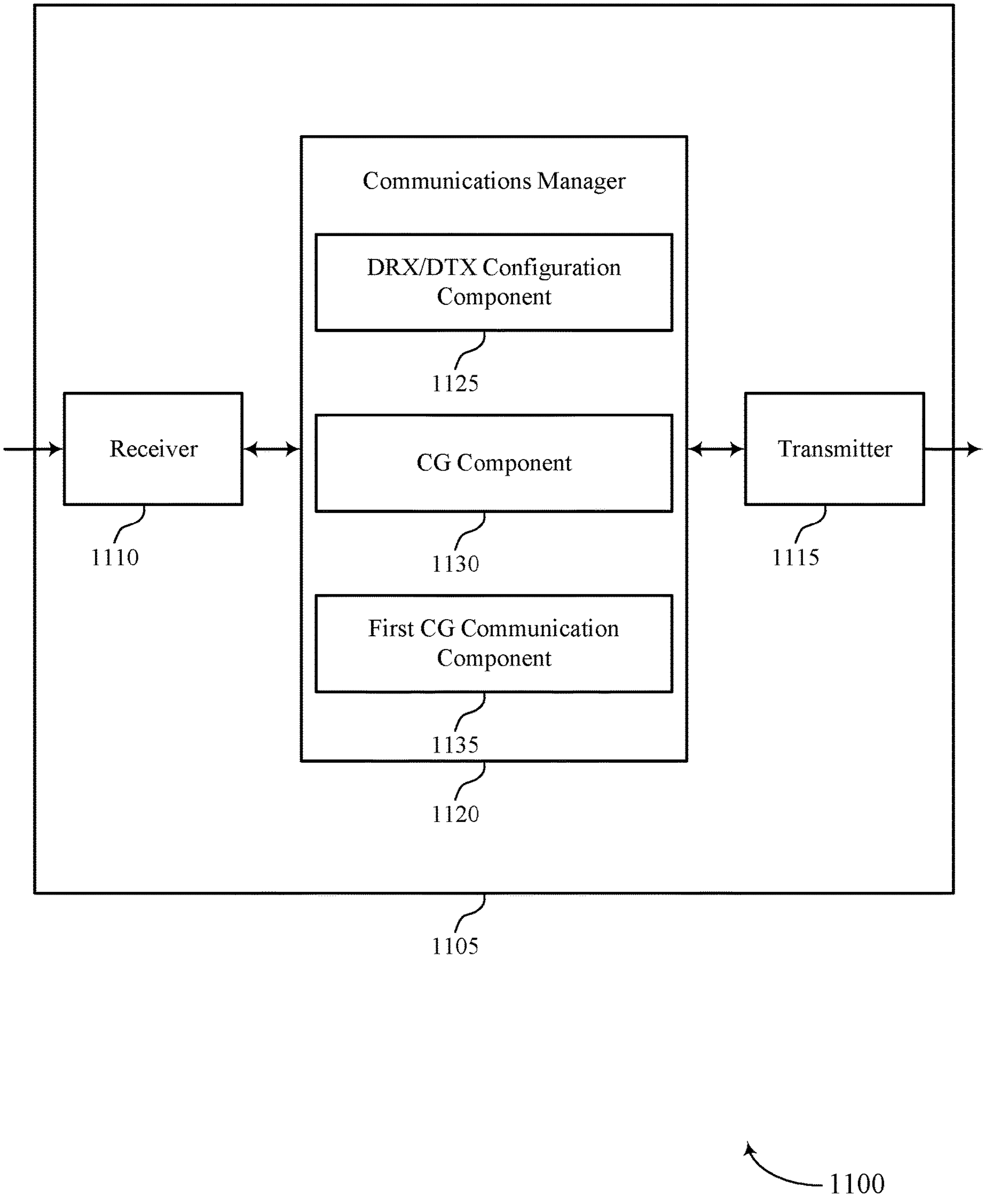

FIG. 11 shows a block diagram 1100 of a device 1105 that supports techniques for determining a feedback identifier in an inactive communication period in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105, or one of more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for determining a feedback identifier in an inactive communication period as described herein. For example, the communications manager 1120 may include a DRX/DTX Configuration Component 1125, a CG Component 1130, a First CG Communication Component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The DRX/DTX Configuration Component 1125 is capable of, configured to, or operable to support a means for outputting, to a first network entity, a configuration for communicating with the second network entity, where the configuration indicates a set of multiple discontinuous active time periods for the second network entity and a set of multiple discontinuous inactive time periods for the second network entity. The CG Component 1130 is capable of, configured to, or operable to support a means for outputting a configuration of a set of multiple configured grant transmission occasions for uplink communications by the first network entity. The First CG Communication Component 1135 is capable of, configured to, or operable to support a means for communicating with the first network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

Figure 12:
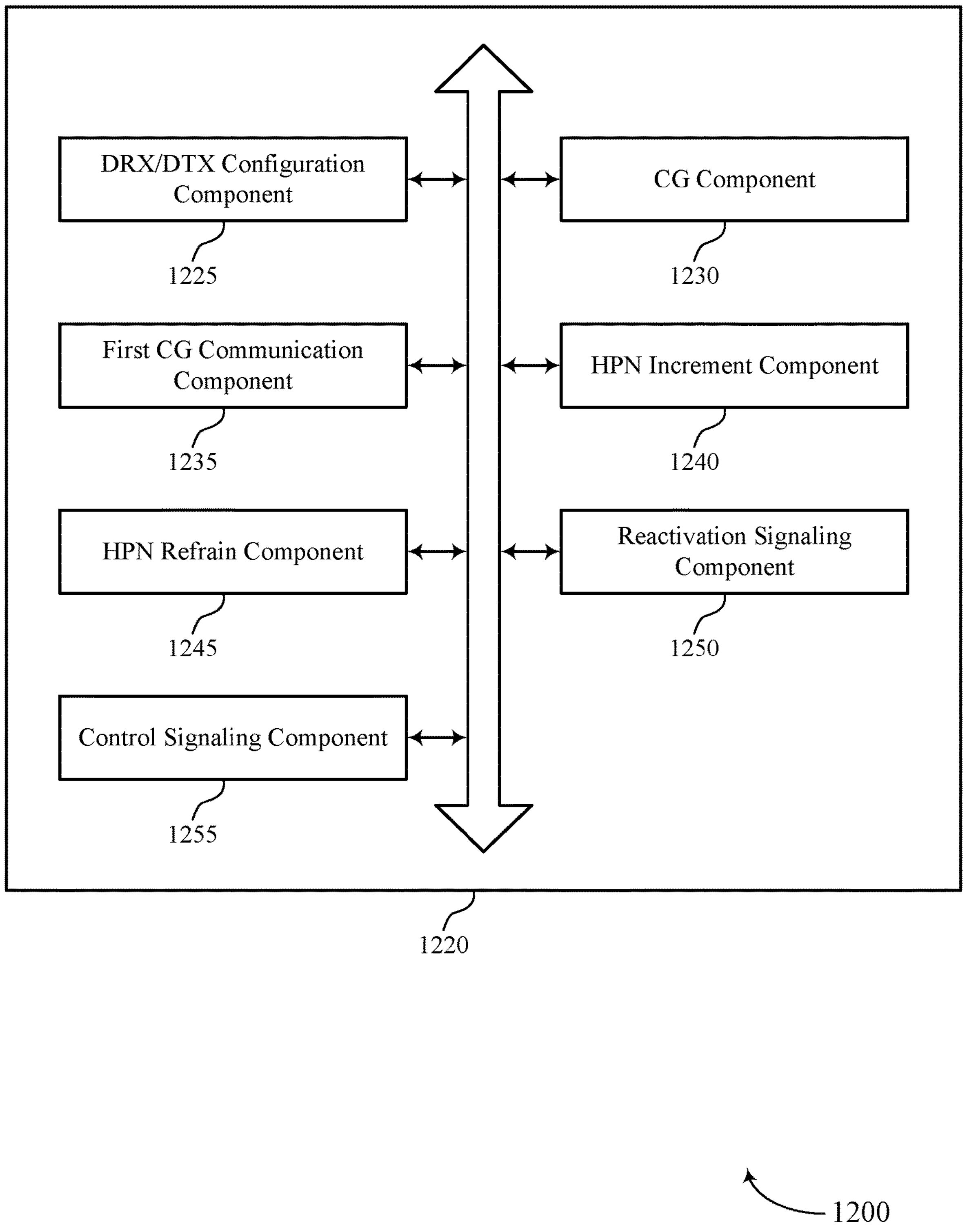
FIG. 12 shows a block diagram of a communications manager that supports techniques for determining a feedback identifier in an inactive communication period in accordance with one or more aspects of the present disclosure.

FIG. 12 shows a block diagram 1200 of a communications manager 1220 that supports techniques for determining a feedback identifier in an inactive communication period in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for determining a feedback identifier in an inactive communication period as described herein. For example, the communications manager 1220 may include a DRX/DTX Configuration Component 1225, a CG Component 1230, a First CG Communication Component 1235, an HPN Increment Component 1240, an HPN Refrain Component 1245, a Reactivation Signaling Component 1250, a Control Signaling Component 1255, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The DRX/DTX Configuration Component 1225 is capable of, configured to, or operable to support a means for outputting, to a first network entity, a configuration for communicating with the second network entity, where the configuration indicates a set of multiple discontinuous active time periods for the second network entity and a set of multiple discontinuous inactive time periods for the second network entity. The CG Component 1230 is capable of, configured to, or operable to support a means for outputting a configuration of a set of multiple configured grant transmission occasions for uplink communications by the first network entity. The First CG Communication Component 1235 is capable of, configured to, or operable to support a means for communicating with the first network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

In some examples, the HPN Increment Component 1240 is capable of, configured to, or operable to support a means for incrementing a value for the HARQ process identifier corresponding to the second configured grant transmission occasion irrespective of the second configured grant transmission occasion that is invalid due to overlapping with the first discontinuous inactive time period.

In some examples, incrementing the value for the HARQ process identifier corresponding to the second configured grant transmission occasion is based on at least one of a retransmission timer that is disabled, a feedback mode that is enabled, a threshold quantity of allowed retransmissions, a quantity of dropped transmission occasions, or a combination thereof.

In some examples, the HPN Refrain Component 1245 is capable of, configured to, or operable to support a means for refraining from incrementing a value for the HARQ process identifier corresponding to the second configured grant transmission occasion based on the second configured grant transmission occasion that is invalid due to overlapping with the first discontinuous inactive time period.

In some examples, the HPN Increment Component 1240 is capable of, configured to, or operable to support a means for incrementing the value for the HARQ process identifier corresponding to the first configured grant transmission occasion occurring after the second configured grant transmission occasion.

In some examples, the Control Signaling Component 1255 is capable of, configured to, or operable to support a means for obtaining an uplink control signal indicating that a quantity of transmission occasions are invalid due to overlapping with one or more of the set of multiple discontinuous inactive time periods, where refraining from incrementing the value for the HARQ process identifier corresponding to the second configured grant transmission occasion is based on obtaining the uplink control signal that indicates the quantity of transmission occasions.

In some examples, the Reactivation Signaling Component 1250 is capable of, configured to, or operable to support a means for outputting an indication to reactivate the second configured grant transmission occasion scheduled to be invalid due to overlapping with the first discontinuous inactive time period.

In some examples, the HPN Increment Component 1240 is capable of, configured to, or operable to support a means for incrementing a value for the HARQ process identifier corresponding to the second configured grant transmission occasion based on a time difference between receipt of the indication and the second configured grant transmission occasion satisfying a threshold. In some examples, the HPN Increment Component 1240 is capable of, configured to, or operable to support a means for incrementing a value for the HARQ process identifier corresponding to the second configured grant transmission occasion based on an activation purpose corresponding to the indication that is a synchronization signal block transmission or a random access channel transmission.

In some examples, the HPN Refrain Component 1245 is capable of, configured to, or operable to support a means for refraining from incrementing a value for the HARQ process identifier corresponding to the second configured grant transmission occasion based on a time difference between transmission of the indication and the second configured grant transmission occasion satisfying a threshold and an activation purpose corresponding to the indication that is other than a synchronization signal block transmission or a random access channel transmission.

Figure 13:
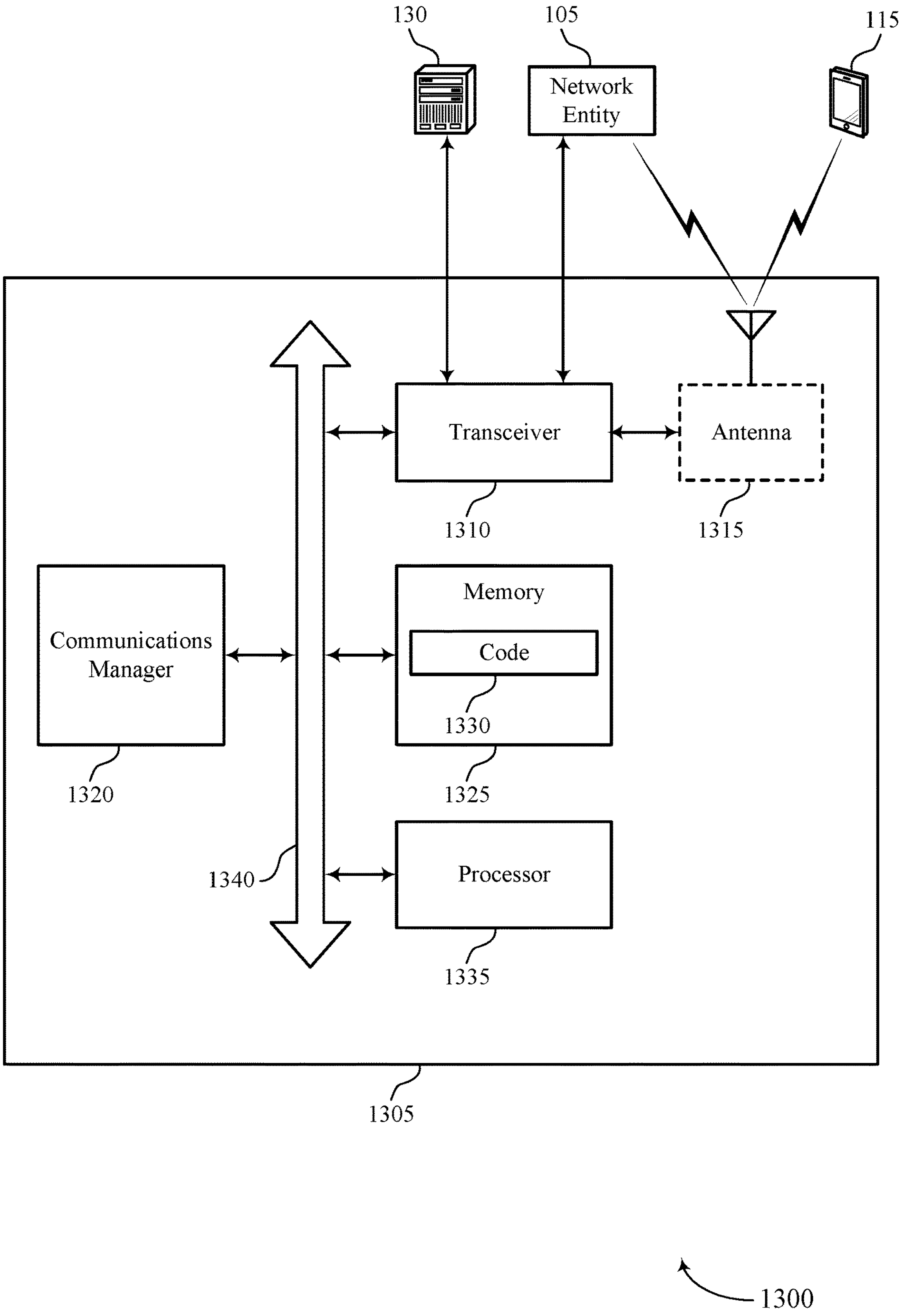
FIG. 13 shows a diagram of a system including a device that supports techniques for determining a feedback identifier in an inactive communication period in accordance with one or more aspects of the present disclosure.

FIG. 13 shows a diagram of a system 1300 including a device 1305 that supports techniques for determining a feedback identifier in an inactive communication period in accordance with one or more aspects of the present disclosure. The device 1305 may be an example of or include the components of a device 1005, a device 1105, or a network entity 105 as described herein. The device 1305 may communicate with one or more network entities 105, one or more first network entities 105, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting techniques for determining a feedback identifier in an inactive communication period). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more first network entities 105. In some examples, the communications manager 1320 may manage communications with other network entities 105, and may include a controller or scheduler for controlling communications with first network entities 105 in cooperation with other network entities 105. In some examples, the communications manager 1320 may support an X2 interface within an LTE/LTE-A wireless communications network technology to provide communication between network entities 105.

For example, the communications manager 1320 is capable of, configured to, or operable to support a means for outputting, to a first network entity, a configuration for communicating with the second network entity, where the configuration indicates a set of multiple discontinuous active time periods for the second network entity and a set of multiple discontinuous inactive time periods for the second network entity. The communications manager 1320 is capable of, configured to, or operable to support a means for outputting a configuration of a set of multiple configured grant transmission occasions for uplink communications by the first network entity. The communications manager 1320 is capable of, configured to, or operable to support a means for communicating with the first network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, longer battery life, and improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of techniques for determining a feedback identifier in an inactive communication period as described herein, or the at least one processor 1335 and the at least one memory 1325 may be otherwise configured to, individually or collectively, perform or support such operations.

Figure 14:
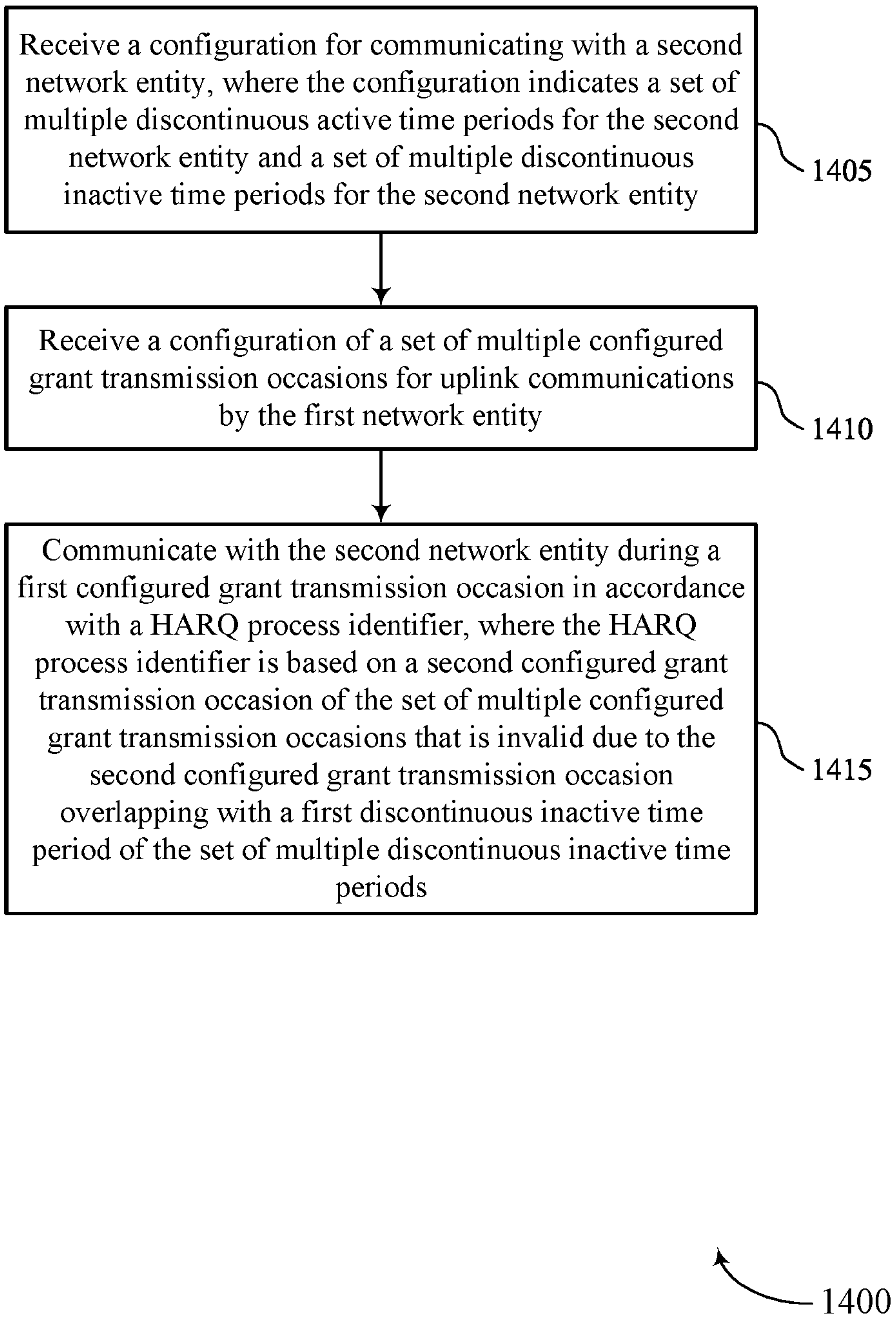
FIGS. 14 through 17 show flowcharts illustrating methods that support techniques for determining a feedback identifier in an inactive communication period in accordance with one or more aspects of the present disclosure.

FIG. 14 shows a flowchart illustrating a method 1400 that supports techniques for determining a feedback identifier in an inactive communication period in accordance with one or more aspects of the present disclosure. The operations of the method 1400 may be implemented by a first network entity or its components as described herein. For example, the operations of the method 1400 may be performed by a first network entity 115 (e.g., UE 115) as described with reference to FIGS. 1 through 9. In some examples, a first network entity may execute a set of instructions to control the functional elements of the first network entity to perform the described functions. Additionally, or alternatively, the first network entity may perform aspects of the described functions using special-purpose hardware.

At 1405, the method may include receiving a configuration for communicating with a second network entity, where the configuration indicates a set of multiple discontinuous active time periods for the second network entity and a set of multiple discontinuous inactive time periods for the second network entity. The operations of block 1405 may be performed in accordance with examples as disclosed herein. In some examples, aspects of the operations of 1405 may be performed by a DRX/DTX Component 825 as described with reference to FIG. 8.

At 1410, the method may include receiving a configuration of a set of multiple configured grant transmission occasions for uplink communications by the first network entity. The operations of block 1410 may be performed in accordance with examples as disclosed herein. In some examples, aspects of the operations of 1410 may be performed by a CG Component 830 as described with reference to FIG. 8.

At 1415, the method may include communicating with the second network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods. The operations of block 1415 may be performed in accordance with examples as disclosed herein. In some examples, aspects of the operations of 1415 may be performed by a First CG Communication Component 835 as described with reference to FIG. 8.

Figure 15:
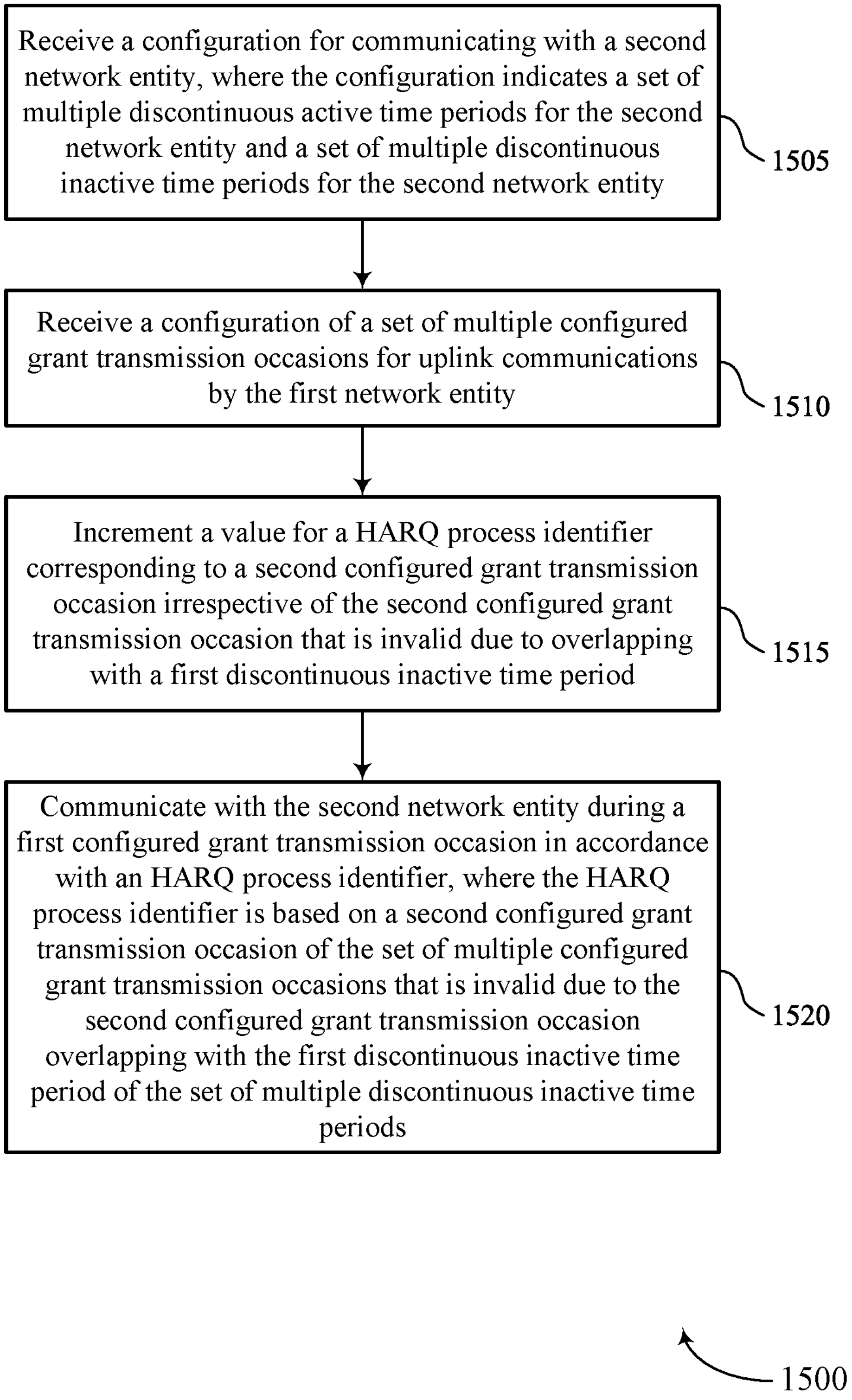

FIG. 15 shows a flowchart illustrating a method 1500 that supports techniques for determining a feedback identifier in an inactive communication period in accordance with one or more aspects of the present disclosure. The operations of the method 1500 may be implemented by a first network entity or its components as described herein. For example, the operations of the method 1500 may be performed by a first network entity 115 (e.g., UE 115) as described with reference to FIGS. 1 through 9. In some examples, a first network entity may execute a set of instructions to control the functional elements of the first network entity to perform the described functions. Additionally, or alternatively, the first network entity may perform aspects of the described functions using special-purpose hardware.

At 1505, the method may include receiving a configuration for communicating with a second network entity, where the configuration indicates a set of multiple discontinuous active time periods for the second network entity and a set of multiple discontinuous inactive time periods for the second network entity. The operations of block 1505 may be performed in accordance with examples as disclosed herein. In some examples, aspects of the operations of 1505 may be performed by a DRX/DTX Component 825 as described with reference to FIG. 8.

At 1510, the method may include receiving a configuration of a set of multiple configured grant transmission occasions for uplink communications by the first network entity. The operations of block 1510 may be performed in accordance with examples as disclosed herein. In some examples, aspects of the operations of 1510 may be performed by a CG Component 830 as described with reference to FIG. 8.

At 1515, the method may include incrementing a value for a HARQ process identifier corresponding to a second configured grant transmission occasion irrespective of the second configured grant transmission occasion that is invalid due to overlapping with a first discontinuous inactive time period. The operations of block 1515 may be performed in accordance with examples as disclosed herein. In some examples, aspects of the operations of 1515 may be performed by an HPN Increment Component 840 as described with reference to FIG. 8.

At 1520, the method may include communicating with the second network entity during a first configured grant transmission occasion in accordance with the HARQ process identifier, where the HARQ process identifier is based on the second configured grant transmission occasion of the set of multiple configured grant transmission occasions that is invalid due to the second configured grant transmission occasion overlapping with the first discontinuous inactive time period of the set of multiple discontinuous inactive time periods. The operations of block 1520 may be performed in accordance with examples as disclosed herein. In some examples, aspects of the operations of 1520 may be performed by a First CG Communication Component 835 as described with reference to FIG. 8.

Figure 16:
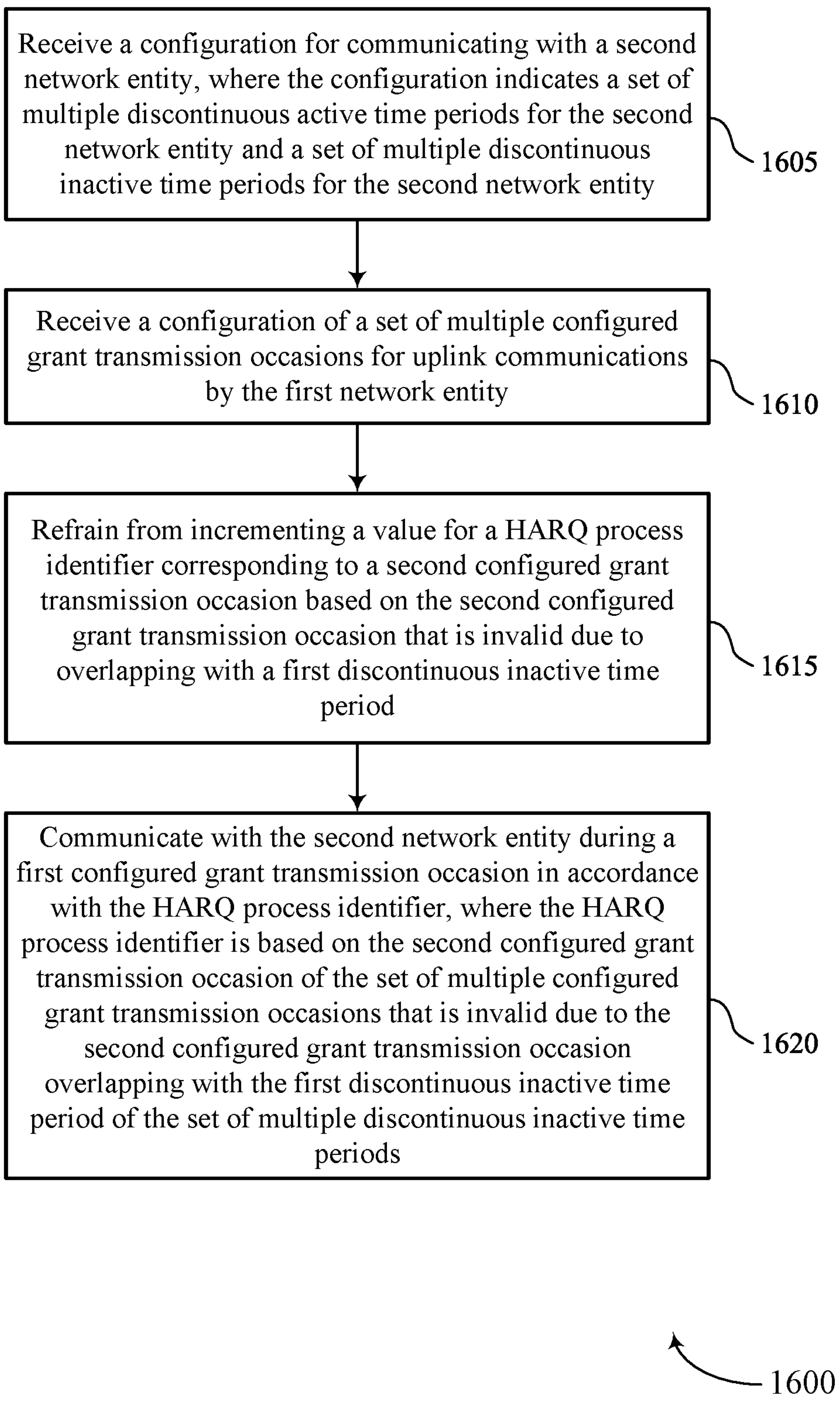

FIG. 16 shows a flowchart illustrating a method 1600 that supports techniques for determining a feedback identifier in an inactive communication period in accordance with one or more aspects of the present disclosure. The operations of the method 1600 may be implemented by a first network entity or its components as described herein. For example, the operations of the method 1600 may be performed by a first network entity 115 (e.g., UE 115) as described with reference to FIGS. 1 through 9. In some examples, a first network entity may execute a set of instructions to control the functional elements of the first network entity to perform the described functions. Additionally, or alternatively, the first network entity may perform aspects of the described functions using special-purpose hardware.

At 1605, the method may include receiving a configuration for communicating with a second network entity, where the configuration indicates a set of multiple discontinuous active time periods for the second network entity and a set of multiple discontinuous inactive time periods for the second network entity. The operations of block 1605 may be performed in accordance with examples as disclosed herein. In some examples, aspects of the operations of 1605 may be performed by a DRX/DTX Component 825 as described with reference to FIG. 8.

At 1610, the method may include receiving a configuration of a set of multiple configured grant transmission occasions for uplink communications by the first network entity. The operations of block 1610 may be performed in accordance with examples as disclosed herein. In some examples, aspects of the operations of 1610 may be performed by a CG Component 830 as described with reference to FIG. 8.

At 1615, the method may include refraining from incrementing a value for a HARQ process identifier corresponding to a second configured grant transmission occasion based on the second configured grant transmission occasion that is invalid due to overlapping with a first discontinuous inactive time period. The operations of block 1615 may be performed in accordance with examples as disclosed herein. In some examples, aspects of the operations of 1615 may be performed by an HPN Refrain Component 845 as described with reference to FIG. 8.

At 1620, the method may include communicating with the second network entity during a first configured grant transmission occasion in accordance with the HARQ process identifier, where the HARQ process identifier is based on the second configured grant transmission occasion of the set of multiple configured grant transmission occasions that is invalid due to the second configured grant transmission occasion overlapping with the first discontinuous inactive time period of the set of multiple discontinuous inactive time periods. The operations of block 1620 may be performed in accordance with examples as disclosed herein. In some examples, aspects of the operations of 1620 may be performed by a First CG Communication Component 835 as described with reference to FIG. 8.

Figure 17:
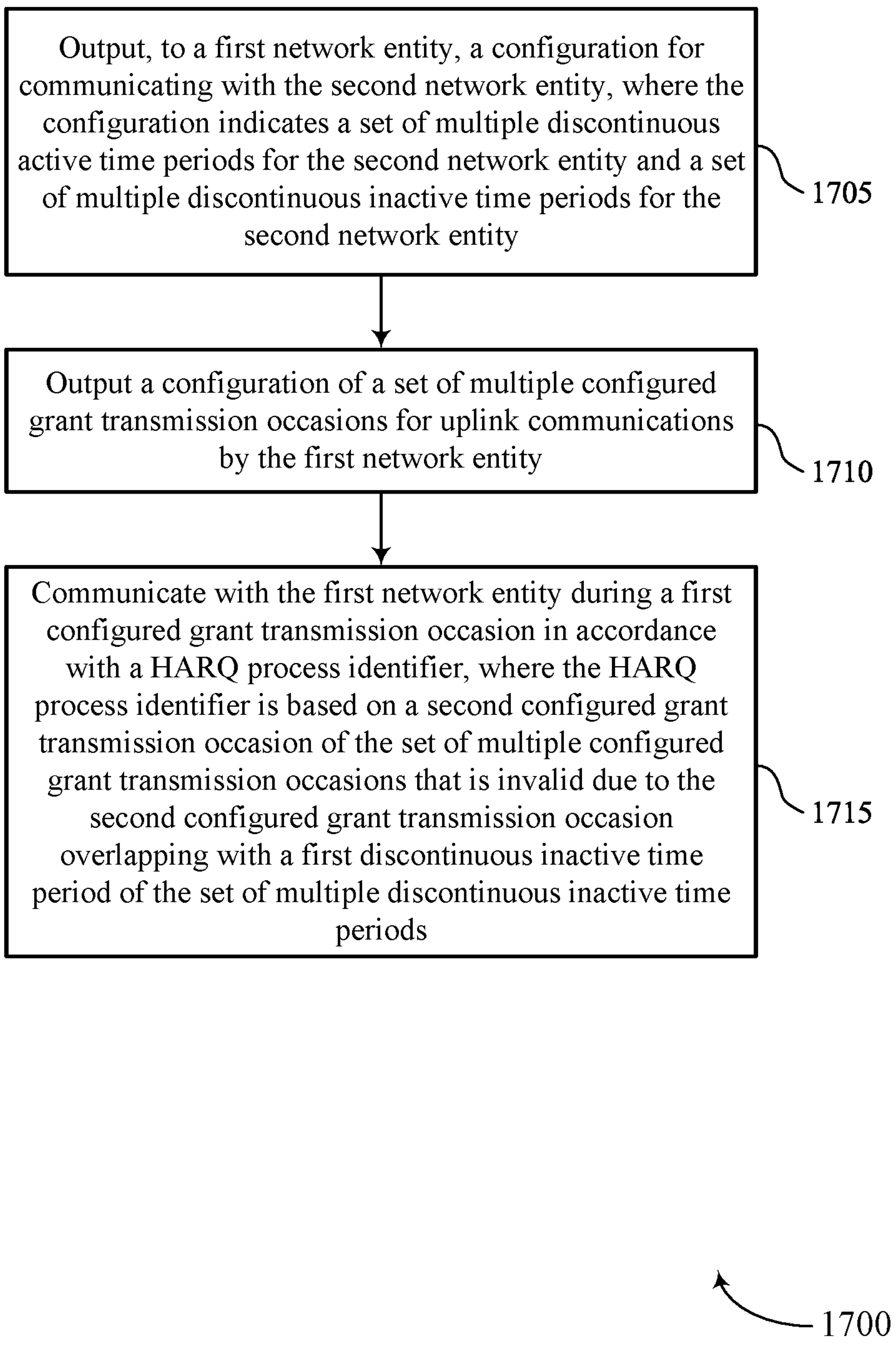

FIG. 17 shows a flowchart illustrating a method 1700 that supports techniques for determining a feedback identifier in an inactive communication period in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include outputting, to a first network entity, a configuration for communicating with the second network entity, where the configuration indicates a set of multiple discontinuous active time periods for the second network entity and a set of multiple discontinuous inactive time periods for the second network entity. The operations of block 1705 may be performed in accordance with examples as disclosed herein. In some examples, aspects of the operations of 1705 may be performed by a DRX/DTX Configuration Component 1225 as described with reference to FIG. 12.

At 1710, the method may include outputting a configuration of a set of multiple configured grant transmission occasions for uplink communications by the first network entity. The operations of block 1710 may be performed in accordance with examples as disclosed herein. In some examples, aspects of the operations of 1710 may be performed by a CG Component 1230 as described with reference to FIG. 12.

At 1715, the method may include communicating with the first network entity during a first configured grant transmission occasion in accordance with an HARQ process identifier, where the HARQ process identifier is based on a second configured grant transmission occasion of the set of multiple configured grant transmission occasions that is invalid due to the second configured grant transmission occasion overlapping with a first discontinuous inactive time period of the set of multiple discontinuous inactive time periods. The operations of block 1715 may be performed in accordance with examples as disclosed herein. In some examples, aspects of the operations of 1715 may be performed by a First CG Communication Component 1235 as described with reference to FIG. 12.

The following provides an overview of aspects of the present disclosure:

Aspect 1: A method of wireless communications performed by a first network entity, comprising: receiving a configuration for communicating with a second network entity, wherein the configuration indicates a plurality of discontinuous active time periods for the second network entity and a plurality of discontinuous inactive time periods for the second network entity; receiving a configuration of a plurality of CG transmission occasions for uplink communications by the first network entity; and communicating with the second network entity during a first CG transmission occasion in accordance with a HARQ process identifier, wherein the HARQ process identifier is based on a second CG transmission occasion of the plurality of CG transmission occasions that is invalid due to the second CG transmission occasion overlapping with a first discontinuous inactive time period of the plurality of discontinuous inactive time periods.

Aspect 2: The method of aspect 1, further comprising: incrementing a value for the HARQ process identifier corresponding to the second CG transmission occasion irrespective of the second CG transmission occasion that is invalid due to overlapping with the first discontinuous inactive time period.

Aspect 3: The method of aspect 2, wherein incrementing the value for the HARQ process identifier corresponding to the second CG transmission occasion is based on at least one of a retransmission timer that is disabled, a feedback mode that is enabled, a threshold quantity of allowed retransmissions, a quantity of dropped transmission occasions, or a combination thereof.

Aspect 4: The method of aspect 1, further comprising: refraining from incrementing a value for the HARQ process identifier corresponding to the second CG transmission occasion based on the second CG transmission occasion that is invalid due to overlapping with the first discontinuous inactive time period.

Aspect 5: The method of aspect 4, further comprising: incrementing the value for the HARQ process identifier corresponding to the first CG transmission occasion occurring after the second CG transmission occasion.

Aspect 6: The method of any of aspects 4 through 5, further comprising: transmitting an uplink control signal indicating that a quantity of transmission occasions are invalid due to overlapping with one or more of the plurality of discontinuous inactive time periods, wherein to refrain from incrementing the value for the HARQ process identifier corresponding to the second CG transmission occasion is based on transmitting the uplink control signal that indicates the quantity of transmission occasions.

Aspect 7: The method of any of aspects 1 through 3, further comprising: receiving an indication to reactivate the second CG transmission occasion scheduled to be invalid due to overlapping with the first discontinuous inactive time period.

Aspect 8: The method of aspect 7, further comprising: incrementing a value for the HARQ process identifier corresponding to the second CG transmission occasion based on a time difference between receipt of the indication and the second CG transmission occasion satisfying a threshold.

Aspect 9: The method of any of aspects 7 through 8, further comprising: incrementing a value for the HARQ process identifier corresponding to the second CG transmission occasion based on an activation purpose corresponding to the indication that is a synchronization signal block transmission or a random access channel transmission.

Aspect 10: The method of any of aspects 7 through 9, further comprising: refraining from incrementing a value for the HARQ process identifier corresponding to the second CG transmission occasion based on a time difference between receipt of the indication and the second CG transmission occasion satisfying a threshold and an activation purpose corresponding to the indication that is other than a synchronization signal block transmission or a random access channel transmission.

Aspect 11: A method of wireless communications performed by a second network entity, comprising: outputting, to a first network entity, a configuration for communicating with the second network entity, wherein the configuration indicates a plurality of discontinuous active time periods for the second network entity and a plurality of discontinuous inactive time periods for the second network entity; outputting a configuration of a plurality of CG transmission occasions for uplink communications by the first network entity; and communicating with the first network entity during a first CG transmission occasion in accordance with an HARQ process identifier, wherein the HARQ process identifier is based on a second CG transmission occasion of the plurality of CG transmission occasions that is invalid due to the second CG transmission occasion overlapping with a first discontinuous inactive time period of the plurality of discontinuous inactive time periods.

Aspect 12: The method of aspect 11, further comprising: incrementing a value for the HARQ process identifier corresponding to the second CG transmission occasion irrespective of the second CG transmission occasion that is invalid due to overlapping with the first discontinuous inactive time period.

Aspect 13: The method of aspect 12, wherein incrementing the value for the HARQ process identifier corresponding to the second CG transmission occasion is based on at least one of a retransmission timer that is disabled, a feedback mode that is enabled, a threshold quantity of allowed retransmissions, a quantity of dropped transmission occasions, or a combination thereof.

Aspect 14: The method of aspect 11, further comprising: refraining from incrementing a value for the HARQ process identifier corresponding to the second CG transmission occasion based on the second CG transmission occasion that is invalid due to overlapping with the first discontinuous inactive time period.

Aspect 15: The method of aspect 14, further comprising: incrementing the value for the HARQ process identifier corresponding to the first CG transmission occasion occurring after the second CG transmission occasion.

Aspect 16: The method of any of aspects 14 through 15, further comprising: obtaining an uplink control signal indicating that a quantity of transmission occasions are invalid due to overlapping with one or more of the plurality of discontinuous inactive time periods, wherein refraining from incrementing the value for the HARQ process identifier corresponding to the second CG transmission occasion is based on obtaining the uplink control signal that indicates the quantity of transmission occasions.

Aspect 17: The method of any of aspects 11 through 13, further comprising: outputting an indication to reactivate the second CG transmission occasion scheduled to be invalid due to overlapping with the first discontinuous inactive time period.

Aspect 18: The method of aspect 17, further comprising: incrementing a value for the HARQ process identifier corresponding to the second CG transmission occasion based on a time difference between receipt of the indication and the second CG transmission occasion satisfying a threshold.

Aspect 19: The method of any of aspects 17 through 18, further comprising: incrementing a value for the HARQ process identifier corresponding to the second CG transmission occasion based on an activation purpose corresponding to the indication that is a synchronization signal block transmission or a random access channel transmission.

Aspect 20: The method of any of aspects 17 through 19, further comprising: refraining from incrementing a value for the HARQ process identifier corresponding to the second CG transmission occasion based on a time difference between transmission of the indication and the second CG transmission occasion satisfying a threshold and an activation purpose corresponding to the indication that is other than a synchronization signal block transmission or a random access channel transmission.

Aspect 21: A first network entity comprising one or more memories storing processor-executable code, and one or more processors coupled with the one or more memories and individually or collectively operable to execute the code to cause the first network entity to perform a method of any of aspects 1 through 10.

Aspect 22: A first network entity comprising at least one means for performing a method of any of aspects 1 through 10.

Aspect 23: A non-transitory computer-readable medium storing code the code comprising instructions executable by one or more processors to perform a method of any of aspects 1 through 10.

Aspect 24: A second network entity comprising one or more memories storing processor-executable code, and one or more processors coupled with the one or more memories and individually or collectively operable to execute the code to cause the second network entity to perform a method of any of aspects 11 through 20.

Aspect 25: A second network entity comprising at least one means for performing a method of any of aspects 11 through 20.

Aspect 26: A non-transitory computer-readable medium storing code the code comprising instructions executable by one or more processors to perform a method of any of aspects 11 through 20.

The methods described herein describe possible implementations, and the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network entity for wireless communication, comprising:

a processing system configured to:

receive a configuration to communicate with a second network entity, wherein the configuration indicates a plurality of discontinuous active time periods for the second network entity and a plurality of discontinuous inactive time periods for the second network entity;

receive a configuration of a plurality of configured grant transmission occasions for uplink communications by the first network entity;

receive an indication to reactivate a first configured grant transmission occasion of the plurality of configured grant transmission occasions, the first configured grant transmission occasion scheduled as an invalid occasion due to overlap with a first discontinuous inactive time period of the plurality of discontinuous inactive time periods;

increment a value for a hybrid automatic repeat request (HARQ) process identifier corresponding to the first configured grant transmission occasion based on a time difference between receipt of the indication and the first configured grant transmission occasion satisfying a threshold; and communicate with the second network entity during a second configured grant transmission occasion in accordance with the HARQ process identifier, wherein the HARQ process identifier is based on the first configured grant transmission occasion.

2. The first network entity of claim 1, wherein incrementation of the value for the HARQ process identifier corresponding to the first configured grant transmission occasion is based on at least one of a retransmission timer that is disabled, a feedback mode that is enabled, a threshold quantity of allowed retransmissions, a quantity of dropped transmission occasions, or a combination thereof.

3. The first network entity of claim 1, wherein the processing system is configured to, before receipt of the indication to reactivate the first configured grant transmission occasion:

refrain from incrementing the value for the HARQ process identifier corresponding to the first configured grant transmission occasion based on the first configured grant transmission occasion being invalid due to overlap with the first discontinuous inactive time period.

4. The first network entity of claim 3, wherein the processing system is configured to:

increment the value for the HARQ process identifier corresponding to the second configured grant transmission occasion occurring after the first configured grant transmission occasion.

5. The first network entity of claim 3, wherein the processing system is configured to:

transmit an uplink control signal that indicates that a quantity of transmission occasions are invalid due to overlap with one or more of the plurality of discontinuous inactive time periods, wherein the processing system is configured to refrain from incrementing the value for the HARQ process identifier corresponding to the first configured grant transmission occasion based on transmission of the uplink control signal that indicates the quantity of transmission occasions.

6. The first network entity of claim 1, wherein the processing system is configured to:

increment the value for the HARQ process identifier corresponding to the first configured grant transmission occasion based on an activation purpose corresponding to the indication that is a synchronization signal block transmission or a random access channel transmission.

7. The first network entity of claim 1, wherein the processing system is configured to, before receipt of the indication to reactivate the first configured grant transmission occasion:

refrain from incrementing the value for the HARQ process identifier corresponding to the first configured grant transmission occasion based on the time difference between receipt of the indication and the second first configured grant transmission occasion satisfying the threshold and an activation purpose corresponding to the indication that is other than a synchronization signal block transmission or a random access channel transmission.

8. A second network entity for wireless communication, comprising:

a processing system configured to:

output, to a first network entity, a configuration to communicate with the second network entity, wherein the configuration indicates a plurality of discontinuous active time periods for the second network entity and a plurality of discontinuous inactive time periods for the second network entity;

output a configuration of a plurality of configured grant transmission occasions for uplink communications by the first network entity;

output an indication to reactivate a first configured grant transmission occasion of the plurality of configured grant transmission occasions, the first configured grant transmission occasion scheduled as an invalid occasion due to overlap with a first discontinuous inactive time period of the plurality of discontinuous inactive time periods;

increment a value for a hybrid automatic repeat request (HARQ) process identifier corresponding to the first configured grant transmission occasion based on a time difference between output of the indication and the first configured grant transmission occasion satisfying a threshold; and communicate with the first network entity during a second configured grant transmission occasion in accordance with the HARQ process identifier, wherein the HARQ process identifier is based on the first configured grant transmission occasion.

9. The second network entity of claim 8, wherein incrementation of the value for the HARQ process identifier corresponding to the first configured grant transmission occasion is based on at least one of a retransmission timer that is disabled, a feedback mode that is enabled, a threshold quantity of allowed retransmissions, a quantity of dropped transmission occasions, or a combination thereof.

10. The second network entity of claim 8, wherein the processing system is configured to, before output of the indication to reactivate the first configured grant transmission occasion:

refrain from incrementing the value for the HARQ process identifier corresponding to the first configured grant transmission occasion based on the first configured grant transmission occasion being invalid due to overlap with the first discontinuous inactive time period.

11. The second network entity of claim 10, wherein the processing system is configured to:

increment the value for the HARQ process identifier corresponding to the second configured grant transmission occasion occurring after the first configured grant transmission occasion.

12. The second network entity of claim 10, wherein the processing system is configured to:

obtain an uplink control signal that indicates that a quantity of transmission occasions are invalid due to overlap with one or more of the plurality of discontinuous inactive time periods, wherein the processing system is configured to refrain from incrementing the value for the HARQ process identifier corresponding to the first configured grant transmission occasion based on reception of the uplink control signal that indicates the quantity of transmission occasions.

13. The second network entity of claim 8, wherein the processing system is configured to:

increment the value for the HARQ process identifier corresponding to the first configured grant transmission occasion based on an activation purpose corresponding to the indication that is a synchronization signal block transmission or a random access channel transmission.

14. The second network entity of claim 8, wherein the processing system is configured to, before output of the indication to reactivate the first configured grant transmission occasion:

refrain from incrementing the value for the HARQ process identifier corresponding to the first configured grant transmission occasion based on the time difference between receipt of the indication and the first configured grant transmission occasion satisfying the threshold and an activation purpose corresponding to the indication that is other than a synchronization signal block transmission or a random access channel transmission.

15. A method of wireless communications performed by a first network entity, comprising:

receiving a configuration for communicating with a second network entity, wherein the configuration indicates a plurality of discontinuous active time periods for the second network entity and a plurality of discontinuous inactive time periods for the second network entity;

receiving a configuration of a plurality of configured grant transmission occasions for uplink communications by the first network entity;

receiving an indication to reactivate a first configured grant transmission occasion of the plurality of configured grant transmission occasions, the first configured grant transmission occasion scheduled as an invalid occasion due to overlap with a first discontinuous inactive time period of the plurality of discontinuous inactive time periods;

incrementing a value for a hybrid automatic repeat request (HARQ) process identifier corresponding to the first configured grant transmission occasion based on a time difference between receipt of the indication and the first configured grant transmission occasion satisfying a threshold; and communicating with the second network entity during a second configured grant transmission occasion in accordance with the HARQ process identifier, wherein the HARQ process identifier is based on the first configured grant transmission occasion.

16. The method of claim 15, wherein incrementing the value for the HARQ process identifier corresponding to the first configured grant transmission occasion is based on at least one of a retransmission timer that is disabled, a feedback mode that is enabled, a threshold quantity of allowed retransmissions, a quantity of dropped transmission occasions, or a combination thereof.

17. The method of claim 15, further comprising, before receiving the indication to reactivate the first configured grant transmission occasion:

refraining from incrementing the value for the HARQ process identifier corresponding to the first configured grant transmission occasion based on the first configured grant transmission occasion being invalid due to overlap with the first discontinuous inactive time period.

18. The method of claim 17, further comprising:

incrementing the value for the HARQ process identifier corresponding to the second configured grant transmission occasion occurring after the first configured grant transmission occasion.

19. The method of claim 17, further comprising:

transmitting an uplink control signal indicating that a quantity of transmission occasions are invalid due to overlapping with one or more of the plurality of discontinuous inactive time periods, wherein to refrain from incrementing the value for the HARQ process identifier corresponding to the first configured grant transmission occasion is based on transmitting the uplink control signal that indicates the quantity of transmission occasions.

20. A method of wireless communications performed by a second network entity, comprising:

outputting, to a first network entity, a configuration for communicating with the second network entity, wherein the configuration indicates a plurality of discontinuous active time periods for the second network entity and a plurality of discontinuous inactive time periods for the second network entity;

outputting a configuration of a plurality of configured grant transmission occasions for uplink communications by the first network entity;

outputting an indication to reactivate a first configured grant transmission occasion of the plurality of configured grant transmission occasions, the first configured grant transmission occasion scheduled as an invalid occasion due to overlap with a first discontinuous inactive time period of the plurality of discontinuous inactive time periods;

incrementing a value for a hybrid automatic repeat request (HARQ) process identifier corresponding to the first configured grant transmission occasion based on a time difference between output of the indication and the first configured grant transmission occasion satisfying a threshold; and communicating with the first network entity during a second configured grant transmission occasion in accordance with the HARQ process identifier, wherein the HARQ process identifier is based on the first configured grant transmission occasion.

21. The method of claim 20, further comprising, before outputting the indication to reactivate the first configured grant transmission occasion:

refraining from incrementing the value for the HARQ process identifier corresponding to the first configured grant transmission occasion based on the first configured grant transmission occasion being invalid due to overlap with the first discontinuous inactive time period.

* * * * *